(12) United States Patent
Magyar et al.

(10) Patent No.: US 6,797,885 B2
(45) Date of Patent: Sep. 28, 2004

(54) MODULAR ELECTRIC CONDUCTOR

(75) Inventors: Robert P. Magyar, Furlong, PA (US);
Philip Hague, Chicago, IL (US);
Philipp Steiner, Chicago, IL (US);
Michael Joss, Chicago, IL (US)

(73) Assignee: Power Ease, L.L.C., Furlong, PA (US)

( * ) Notice: Subject to any disclaimer, the term of this patent is extended or adjusted under 35 U.S.C. 154(b) by 0 days.

(21) Appl. No.: 10/293,678

(22) Filed: Nov. 13, 2002

(65) Prior Publication Data

US 2003/0094302 A1 May 22, 2003

Related U.S. Application Data

(62) Division of application No. 09/715,816, filed on Nov. 17, 2000, now Pat. No. 6,492,594.
(60) Provisional application No. 60/172,505, filed on Dec. 17, 1999.

(51) Int. Cl.[7] .................................................. H02G 3/04

(52) U.S. Cl. ............................ 174/97; 174/48; 174/95; 174/68.1

(58) Field of Search .............................. 174/97, 48, 95, 174/68.1; 439/120, 209, 212, 216, 535

(56) References Cited

U.S. PATENT DOCUMENTS

| | | |
|---|---|---|
| 3,622,686 A | 11/1971 | Neirinck |
| 3,721,762 A | 3/1973 | Gooding |
| 4,037,900 A | 7/1977 | Schmidger |
| 4,070,078 A | 1/1978 | Chrones |
| 4,255,610 A | 3/1981 | Textoris |
| 4,563,542 A | 1/1986 | Pollack |
| 4,875,871 A | 10/1989 | Booty, Sr. et al. |
| 5,336,849 A | 8/1994 | Whitney |
| 5,756,933 A | 5/1998 | Pitchford et al. |
| 5,802,672 A | 9/1998 | Rohder |
| 5,998,732 A | 12/1999 | Caveney et al. |
| 6,045,374 A | 4/2000 | Candeloro |
| 6,179,476 B1 | 1/2001 | Besler et al. |
| 6,323,421 B1 | 11/2001 | Pawson et al. |

*Primary Examiner*—Dean A. Reichard
*Assistant Examiner*—Jinhee Lee
(74) *Attorney, Agent, or Firm*—Akin Gump Strauss Hauer & Feld, LLP

(57) ABSTRACT

An electrical carrier member has a dielectric shell, an electrical conductor, and at least one open channel extending longitudinally therethrough. The dielectric shell has a longitudinal axis and a plurality of enclosed channels extending longitudinally therethrough. The shell has a first end and a second end. The electrical conductor extends through each enclosed channel. Each electrical conductor terminates proximate to the first end and the second end. The at least one open channel has a longitudinally extending opening to receive at least one conductor cable insertable laterally into the at least one open channel.

5 Claims, 20 Drawing Sheets

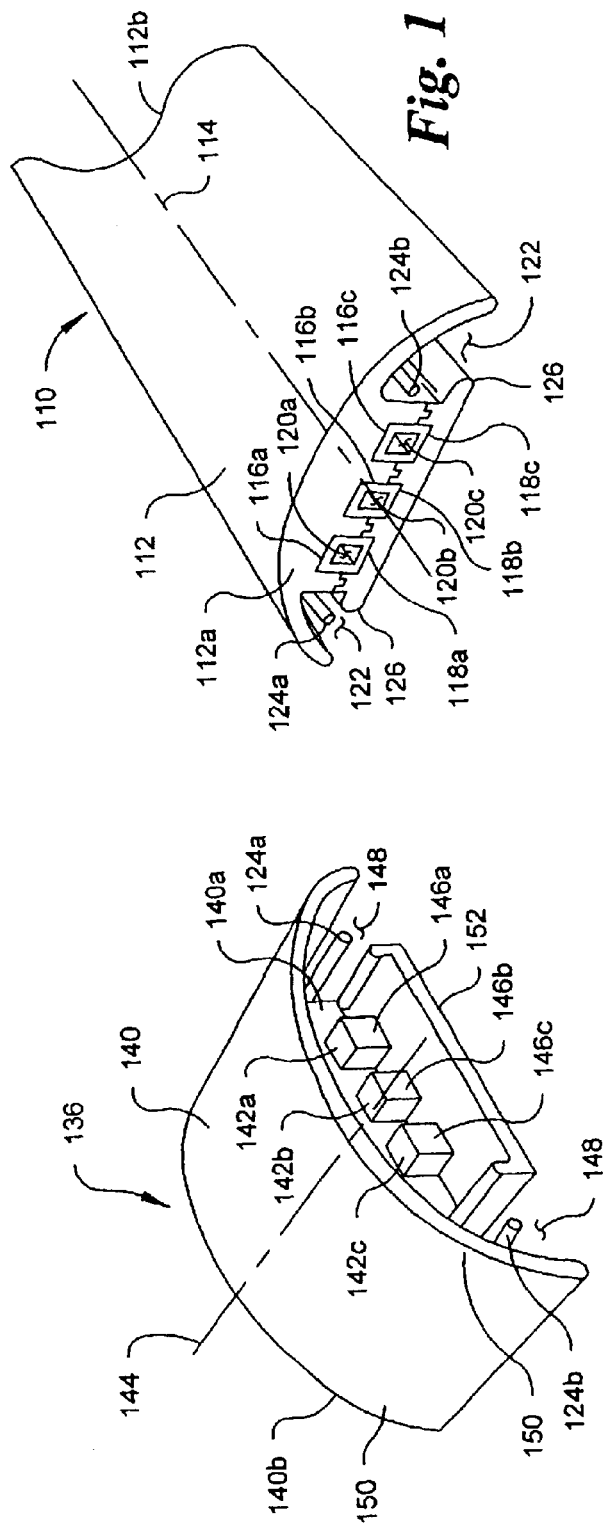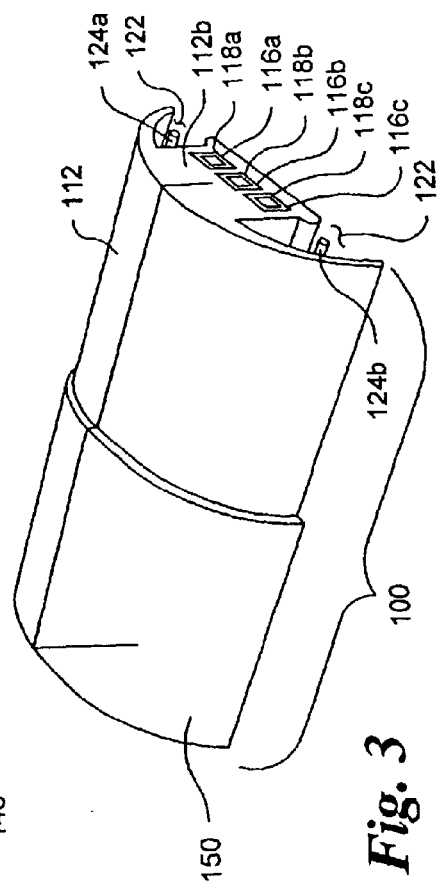

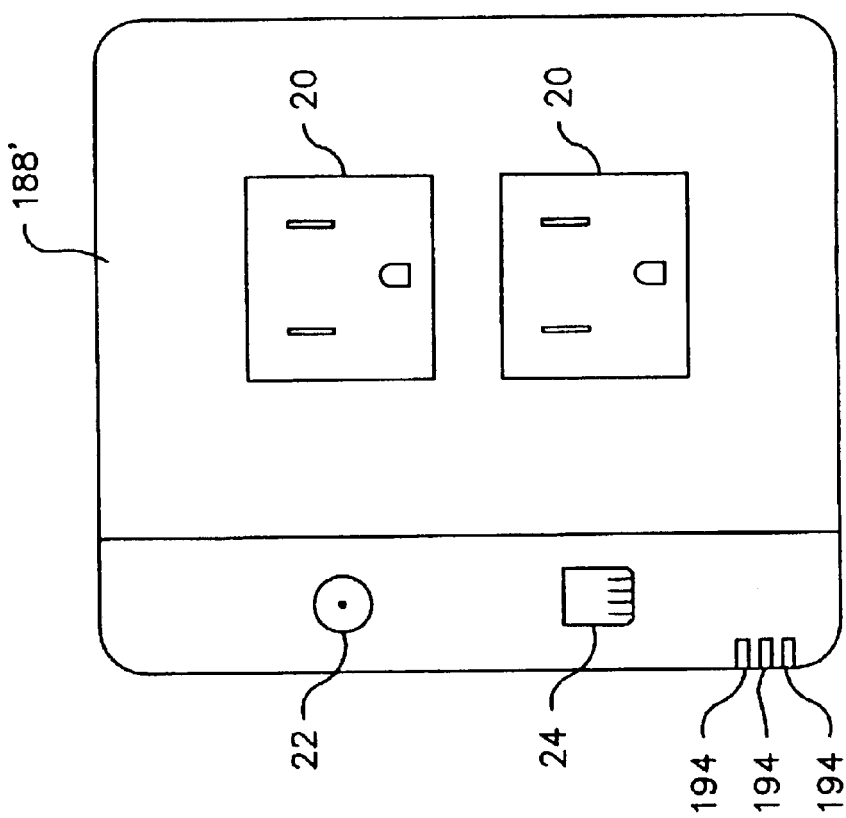

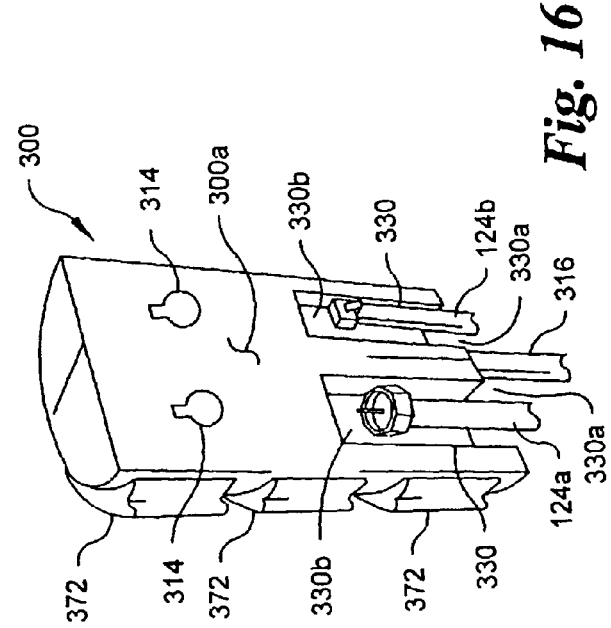
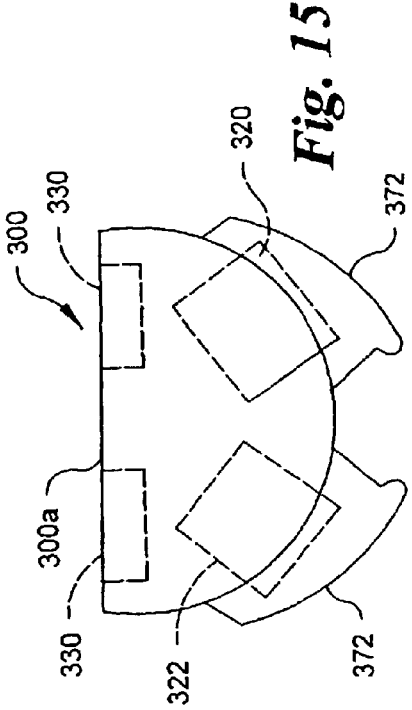
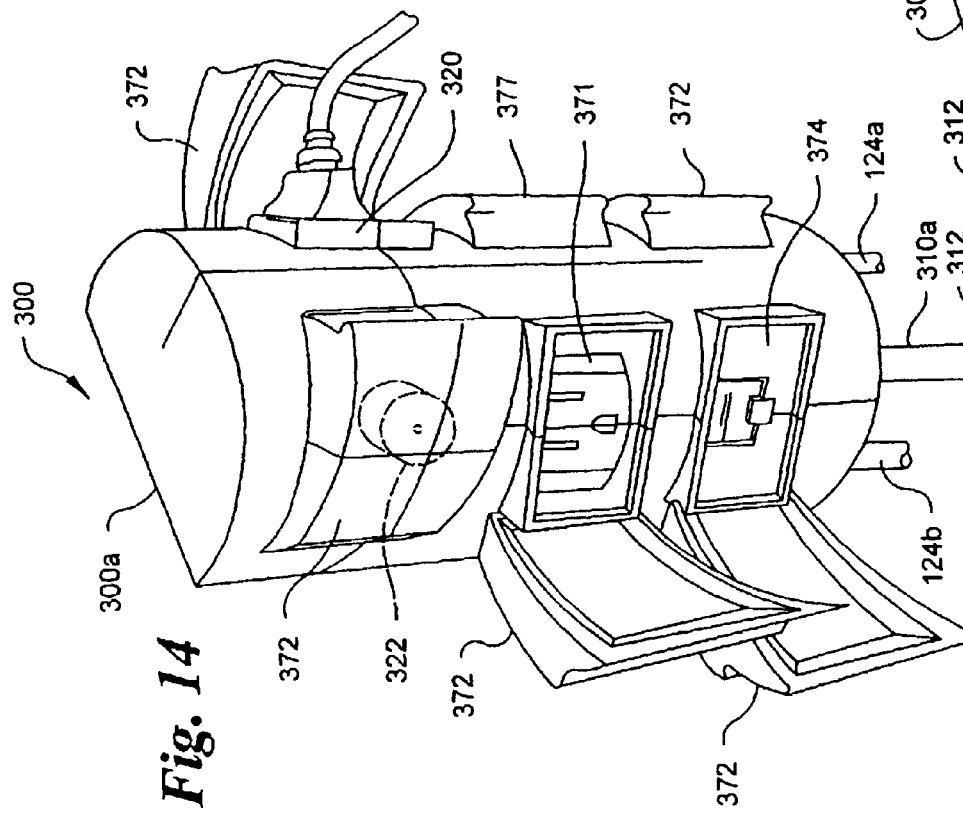
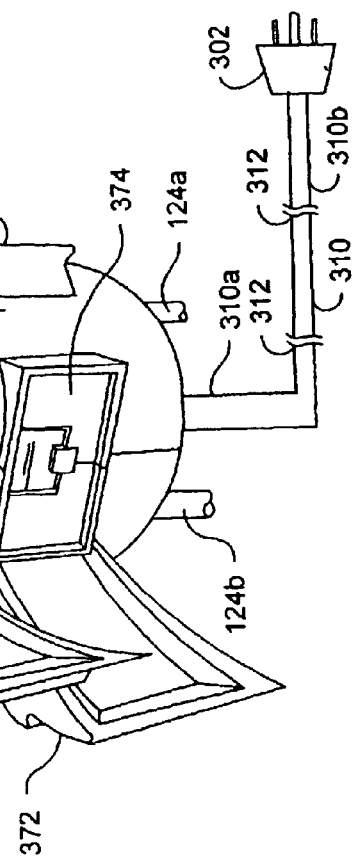

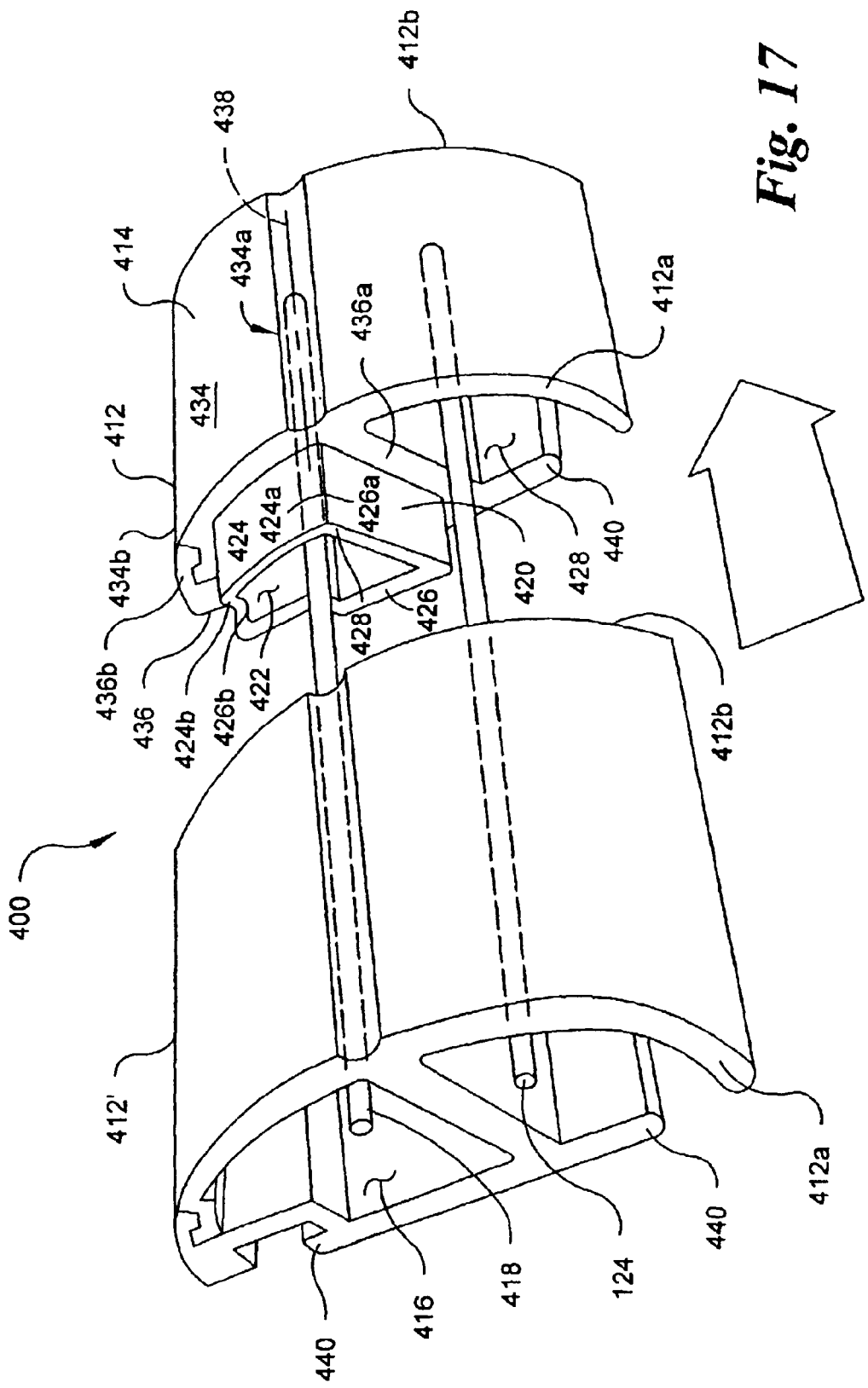

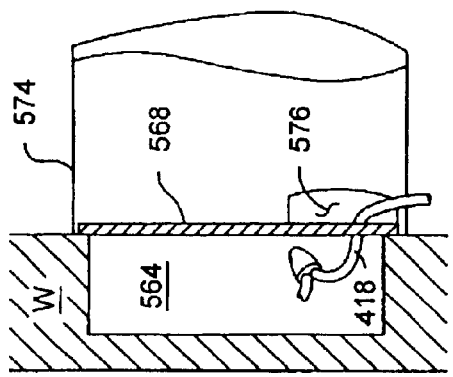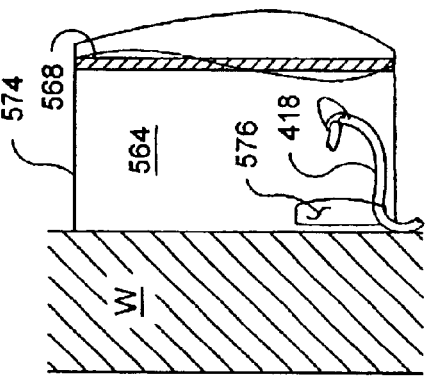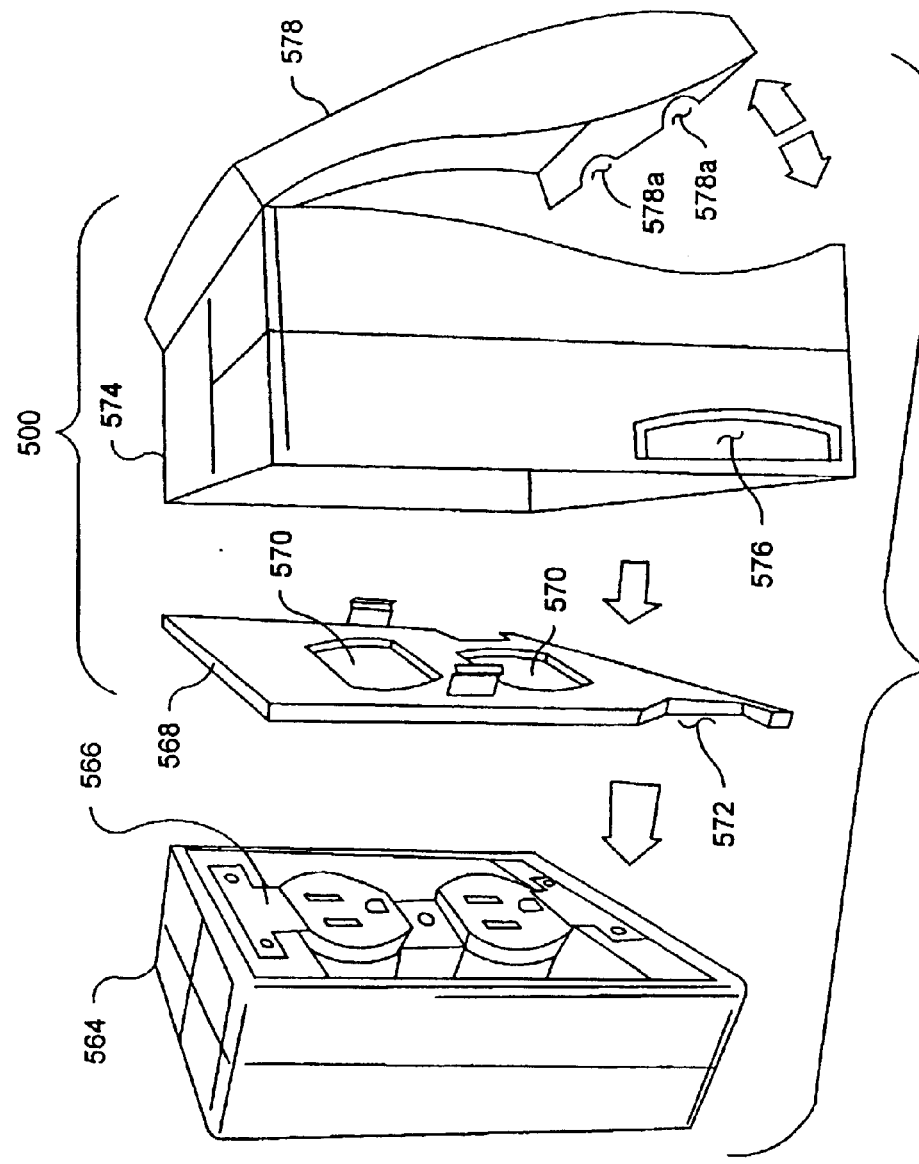

MODULAR ELECTRIC CONDUCTOR

CROSS-REFERENCE TO RELATED APPLICATIONS

This application is a divisional of pending U.S. application Ser. No. 09/715,816 filed Nov. 17, 2000 now U.S. Pat. No. 6,492,594, entitled "Modular Electric Conductor And System" which claims priority under 35 U.S.C. §120 from U.S. Provisional Patent Application No. 60/172,505, filed Dec. 17, 1999, entitled Modular Electric Conductor and System. The enumerated prior applications are hereby incorporated in the entirety herein by reference.

BACKGROUND OF THE INVENTION

It is often desired to provide electricity to areas away from pre-installed electrical outlets. A common example is outside the home, where users often desire to provide electrical power to outdoor patios and decks. Although many homes have outdoor electrical outlets installed on an outside wall of the house, typically only one or two outlets are provided for the entire house and they are invariably located a significant distance from where the electricity is needed. Currently, such a problem is solved by running extension cords from the outlets to the remote location. These extension cords are unsightly and often present a tripping hazard. Additionally, these extension cords may present an electrical shock hazard due to excessive wires which may be run to "non-permanent" devices.

In addition to electricity, it is also often desirous to provide other types of electrical signals, such as cable television, telephone/Internet, and stereo speakers to remote locations away from a pre-installed source. The pre-installed sources for these signals are generally located inside the house, and any extension wires or cords must be run from inside the house, through an open door or window, and to the desired location. Similarly to the electrical power extension cords, these cords being strung from inside the house to the remote location are unsightly and may present a tripping hazard. Additionally, these cords have no protection from being cut, nicked, clipped or snapped.

It is known to provide raceways which can be attached to a surface, such as a side of a house or deck, in which electrical power and other cables may be located, eliminating the running of unsightly cables in the open and eliminating a tripping hazard. Such raceways are disclosed in U.S. Pat. No. 3,622,686 (Neirinck et al.), U.S. Pat. No. 3,721,762 (Gooding), U.S. Pat. No. 4,037,900 (Schmidger), U.S. Pat. No. 4,255,610 (Textoris), U.S. Pat. No. 5,336,849 (Whitney), and U.S. Pat. No. 5,756,933 (Pitchford et al.). However, such raceways are generally not sealed at joints, allowing moisture inside the raceway, thus making the raceway unsuitable for outdoor use.

Additionally, it is also known to provide electrical conductors integrated with such raceways. Such a raceway is disclosed by U.S. Pat. No. 4,875,871 (Booty, Sr. et al.). However, the raceway disclosed by Booty, Sr. et al. is limited by predetermined lengths or a predetermined range of lengths. This limitation restricts the ability to adjust the length of the raceway sections during installation. It would be beneficial to provide an integrated raceway which allows installation of any desired length to fit any particular application. The present invention provides such a capability.

Further, standard electrical power extensions, such as the "Yard Stake", manufactured by Woods®, include only electrical outlets at the terminal end of an extension cable. Since cables which provide other than electrical power, such as telephone (for both telephone and Internet) and co-axial (for cable television) can also be extended, it would be beneficial to provide outlets for such other cables at the terminal end of, or along the length of, the raceway.

BRIEF SUMMARY OF THE INVENTION

Briefly, one aspect of the present invention is an electrical carrier member having a dielectric shell, an electrical conductor, and at least one open channel extending longitudinally therethrough. The dielectric shell has a longitudinal axis and a plurality of enclosed channels extending longitudinally therethrough. The shell has a first end and a second end. The electrical conductor extends through each enclosed channel. Each electrical conductor terminates proximate to the first end and the second end. The at least one open channel has a longitudinally extending opening to receive at least one conductor cable insertable laterally into the at least one open channel.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 1 is a perspective view of one end of a carrier member according to a first preferred embodiment of the present invention;

FIG. 2 is a perspective view of an electrical connector according to a preferred embodiment of the present invention;

FIG. 3 is a perspective view of the raceway and the connector of FIGS. 1 and 2 connected together to form a portion of the electrical system according to the first preferred embodiment of the present invention;

FIG. 10A is a front view of an alternative outlet junction box;

FIG. 14 is a front perspective view of a power strip with an electrical plug;

FIG. 15 is a top plan view of the power strip of FIG. 14;

FIG. 16 is a rear perspective of the power strip of FIG. 14;

FIG. 17 is a perspective view, partially disassembled, of a portion of a raceway assembly according to a second preferred embodiment of the present invention;

FIG. 23 is an exploded perspective view of an outlet junction box;

FIG. 24 is a cutaway side profile view of the outlet junction box of FIG. 23 mounted on a flush-mounted house junction box; and FIG. 25 is a cutaway side profile view of the outlet junction box of FIG. 23 mounted on an externally mounted house junction box.

DETAILED DESCRIPTION OF THE INVENTION

Figure 4:
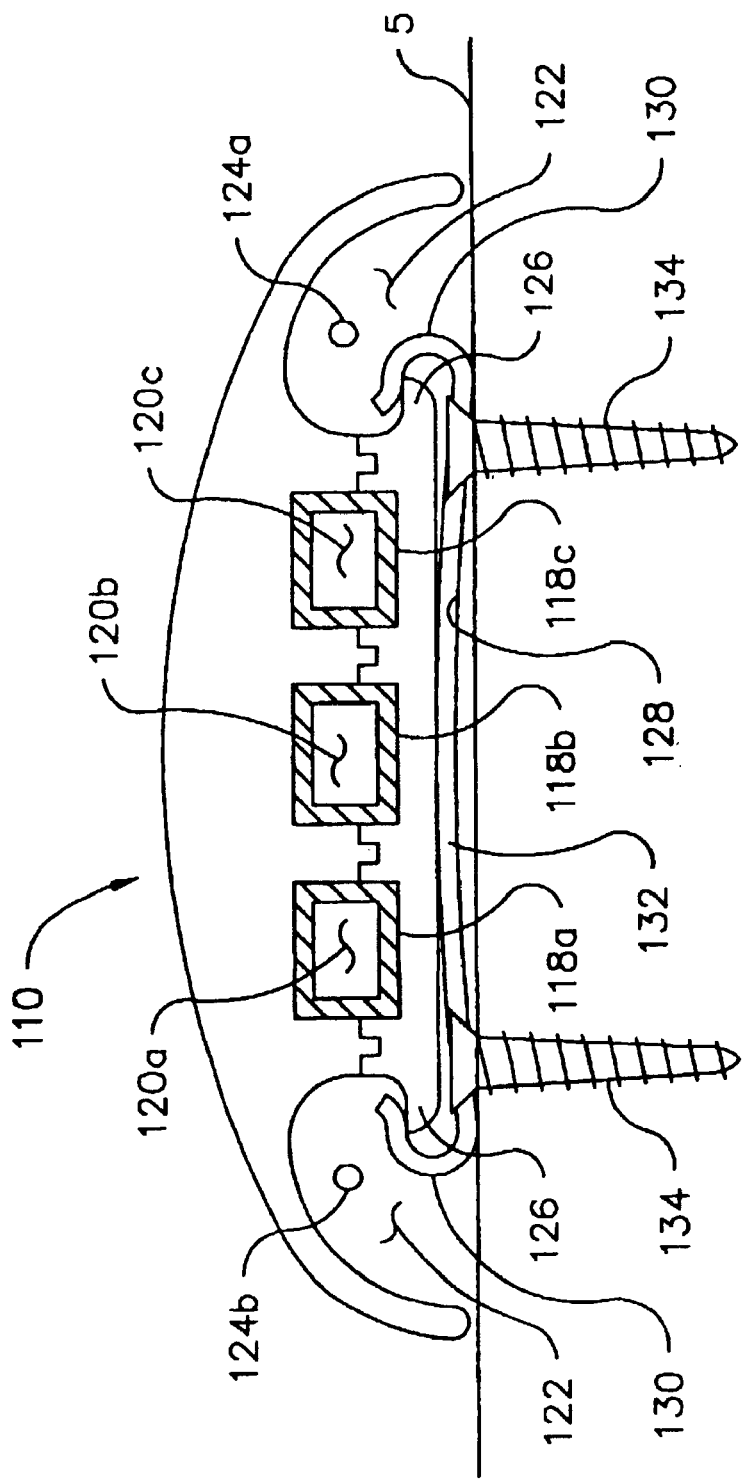
FIG. 4 is an end profile view of the carrier member of FIG. 1.

Certain terminology is used in the following description for convenience only and is not limiting. The words "right," "left," "lower," and "upper" designate directions in the drawings to which reference is made. The words "inwardly" and "outwardly" refer to directions towards and away from, respectively, the geometric center of the raceway in accordance with the present invention, and designated parts thereof. The word "a" is defined to mean "at least one". The terminology includes the words noted above as well as derivatives thereof and words of similar import.

In the drawings, like numerals are used to indicate like elements throughout. The present invention includes several embodiments of electrical distribution systems including an integrated electrical raceway system 100, shown in FIGS. 1–13; a modular outlet assembly 300, shown in FIGS. 14–16; and an open channel raceway system 400, shown in FIGS. 17–25.

FIG. 1 shows a modular electric carrier member 110, generally for use in the integrated raceway 100. The carrier member 110 includes a dielectric shell 112 having a longitudinal axis 114 and a plurality of enclosed channels which extend longitudinally through the shell 112. Preferably, three channels 116a, 116b, 116c are included, although those skilled in the art will recognize that more or less than three channels 116a, 116b, 116c can be used. A hollow electrical conductor 118a, 118b, 118c extends through each enclosed channel 116a, 116b, 116c, respectively. Each electrical conductor 118a, 118b, 118c terminates at the first and second end 112a, 112b, respectively, of the shell 112. Preferably, the conductors 118a, 118b, 118c are constructed from copper or a copper alloy, although those skilled in the art will recognize that the conductors 118a, 118b, 118c can be made from any other electrically conductive material. Each channel 116a, 116b, 116c further includes an open space 120a, 120b, 120c, respectively, which extends longitudinally through the shell 112 inside each hollow conductor 118a, 118b, 118c. As shown in FIG. 1, the open spaces 120a, 120b, 120c are generally box-shaped, although those skilled in the art will recognize that the open spaces 120a, 120b, 120c can be other shapes as well. However, it is preferred that each conductor 118a, 118b, 118c completely surrounds the length of each respective open space 120a, 120b, 120c.

Preferably, a plane of the first end 112a of the shell 112 is generally perpendicular to the longitudinal axis 114 of the shell. Similarly, a plane of the second end 112b of the shell 112 is preferably generally perpendicular to the longitudinal axis 114 of the shell 112. Although, for reasons that will become apparent, it is preferred that the first and second ends 112a, 112b be generally perpendicular to the longitudinal axis 114, those skilled in the art will recognize that the ends 112a, 112b need not be perpendicular to the axis 114.

Figure 4A:
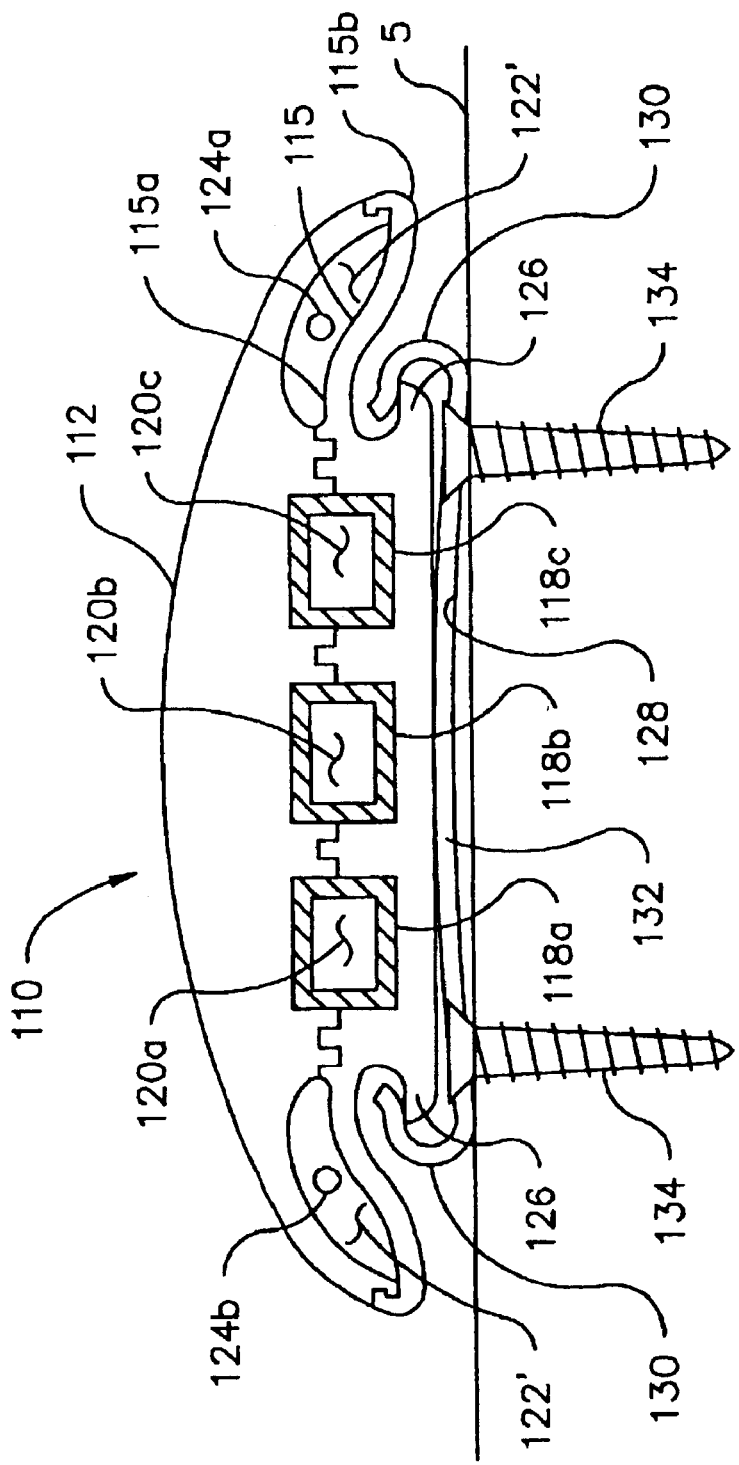
FIG. 4A is an end profile view of an alternate embodiment of the carrier member.

Still referring to FIG. 1, the carrier member 110 further includes at least one open channel 122 extending longitudinally through the shell 112, generally parallel to the enclosed channels 116a, 116b, 116c. Preferably, the at least one open channel 122 is parallel to and spaced apart from one of the enclosed channels 116a, 116b, 116c, and more preferably is located along an outside wall of the shell 112. Also preferably, a second open channel 122 extends along the length of the shell 112 on an opposite side of the shell 112 from the first open channel 122, generally parallel to the enclosed channels 116a, 116b, 116c. Each channel 122 is adapted to support and enclose at least one conductor cable 124a and/or 124b which is insertable into channel 122. The conductor cable 124a, 124b is insertable into the open portion of the open channel 122. The open channel 122 is separated from the conductors 118a, 118b, 118c by the dielectric shell 112, which forms a barrier between the open channel 122 and the conductors 118a, 118b, 118c. The conductor cable 124a, 124b is preferably a low voltage signal carrying cable, including at least one of a coaxial cable 124a, a telephone cable 124b, a computer cable (not shown), a speaker cable (not shown), and a fiber optic cable (not shown). The open channel 122 is sufficiently large to allow connections to be made for the conductor cables 124a, 124b within the channel 122. Although an open channel 122 is preferred, those skilled in the art will realize that a closable channel 122', as shown in FIG. 4A, can be used as well.

The shell 112 further includes mounting lips 126 which preferably extend the length of the shell 112 and which preferably form part of the open channel 122. Referring now to FIG. 4, a mounting bracket 128 includes tangs 130 which extend along each edge of the mounting bracket 128 which are adapted to engage the mounting lips 126. A connecting portion 132 is located generally between and connects the tangs 130 together. At least one fastener 134 extends through the connecting portion for mounting the mounting bracket 128 and the shell 112 to a surface S. Preferably, the fastener 134 is a nail or a screw, including but not limited to wood, concrete, or tile screws, although those skilled in the art will recognize that other fasteners, including adhesives, can be used.

The carrier member 110 is preferably manufactured in predetermined lengths such as four and/or eight feet sections. However, those skilled in the art will recognize that the carrier member 110 can be manufactured in other lengths as well. Additionally, the carrier member 110 can be cut to any desired length to accommodate a particular application or installation location. Preferably, the carrier member 110 can be cut by a saw or other cutting device in a plane generally perpendicular to the longitudinal axis 114 of the carrier member 110. With such a cut, a severed end of the carrier member 110 is functionally identical to either of the first and second ends, 112a, 112b for reasons that will become apparent.

As shown in FIG. 2, an electrical connector 136 is adapted to be connected to the carrier member 110 to form the modular electrical conductor system 100, as shown in FIG. 3. The connector 136 includes a dielectric connector shell 140 with a first connector end 140a and a second connector end 140b. A plurality of connector channels 142a, 142b, 142c extend parallel to a longitudinal axis 144 of the connector 136. Preferably, the connector 136 includes the same number of connector channels 142a, 142b, 142c as the carrier member 110 includes enclosed channels 116a, 116b, 116c. A connector conductor 146a, 146b, 146c (collectively referred to as connector conductors 146) extends longitudinally through each connector channel 142a, 142b, 142c and extends beyond each of the first and second connector ends 140a, 140b. The connector conductors 146 are located within the connector 136 such that, when one of the first and second shell ends 112a, 112b (or a cut end of the carrier member 110) is abutted against one of the first and second connector end 140a, 140b, each connector conductor 146 is insertable into an open space 120a, 120b, 120c such that each connector conductor 146 is inserted into and electrically connected to a respective conductor 118a, 118b, 118c.

Preferably, the connector conductors 146 are generally box-shaped and are biased outward toward the interior walls of the respective conductors 118a, 118b, 118c to establish a positive contact between the connector conductors 146 and the walls of the conductors 118a, 118b, 118c, establishing mechanical tension between the connector conductors 146 and the conductors 118a, 118b, 118c. The biasing can be performed by splitting the connector conductor 146 longitudinally or by other means known by those skilled in the art.

Although, preferably, the connector 136 includes connector conductors 146 which are insertable inside the conductors 118a, 118b, 118c, those skilled in the art will recognize that the connector 136 can include connector conductors that circumscribe the conductors 118a, 118b, 118c so long as the connector conductors can be inserted between the conductors 118a, 118b, 118c and the dielectric material surrounding the connector conductors 118a, 118b, 118c.

Preferably, each connector end 140a, 140b includes at least one open channel 148 which extends longitudinally along the electrical connector 136 such that, when the carrier member 110 and the connector 136 are electrically connected as described above, each open channel 148 is aligned with a respective open channel 122 in the carrier member 110. Similar to the carrier member 110 above, the open channel 148 is shielded from the connector conductors 146 by the dielectric material which forms the connector shell 140. As a result, the conductor cables 124a, 124b, which are insertable into the open channel 122 of the carrier member 110, can extend along the open channel 148 of the connector 136 as well. Although the channels 122, 148 are preferably open, those skilled in the art will recognize that the channels 122, 148 can also be closed or closable instead.

The connector 136 also includes a top cover 150 located at each end 140a, 140b and extending beyond each end 140a and 140b. Preferably, each top cover 150 extends beyond the longest conductor 146, although those skilled in the art will recognize that the top cover 150 need not extend as far as the longest conductor 146. A bottom cover 152 extends from the bottom of each connector end 140a, 140b and preferably terminates at a location generally coplanar with the end of the top cover 150.

As seen in FIG. 3, the top cover 150 fits over the top of the carrier member shell 112 and the bottom cover 152 engages the bottom of the shell 112 in a preferably water tight sealing engagement which prevents water from entering the interface between the first end 112a of the carrier member 110 and the first end 140a of the connector 136. A second carrier member (not shown) can be similarly connected to the second end 140b of the connector 136, with the connector 136 providing an electrical connection between the first carrier member 110 and the second carrier member. Additional connectors 136 and additional carrier members 110 can be similarly connected to free ends 112a, 112b, 140a, 140b of carrier members 110 and connectors 136 to extend the electrical system 100 as long as desired within the limits of the line length guidelines for a particular conductor gauge and anticipated load. Additionally, as described above, the carrier member 110 can be cut at any desired location generally perpendicular to the longitudinal axis 114 to provide a carrier member length as desired for a particular application.

Although it is preferred that the top cover 150 and bottom cover 152 extend from the ends of the connector 136, those skilled in the art will recognize that the covers 150, 152 can extend instead from the ends of the carrier member 110 to provide a sealing engagement with the connector shell 136 when the carrier member 110 and the connector 136 are connected together.

Figure 5:
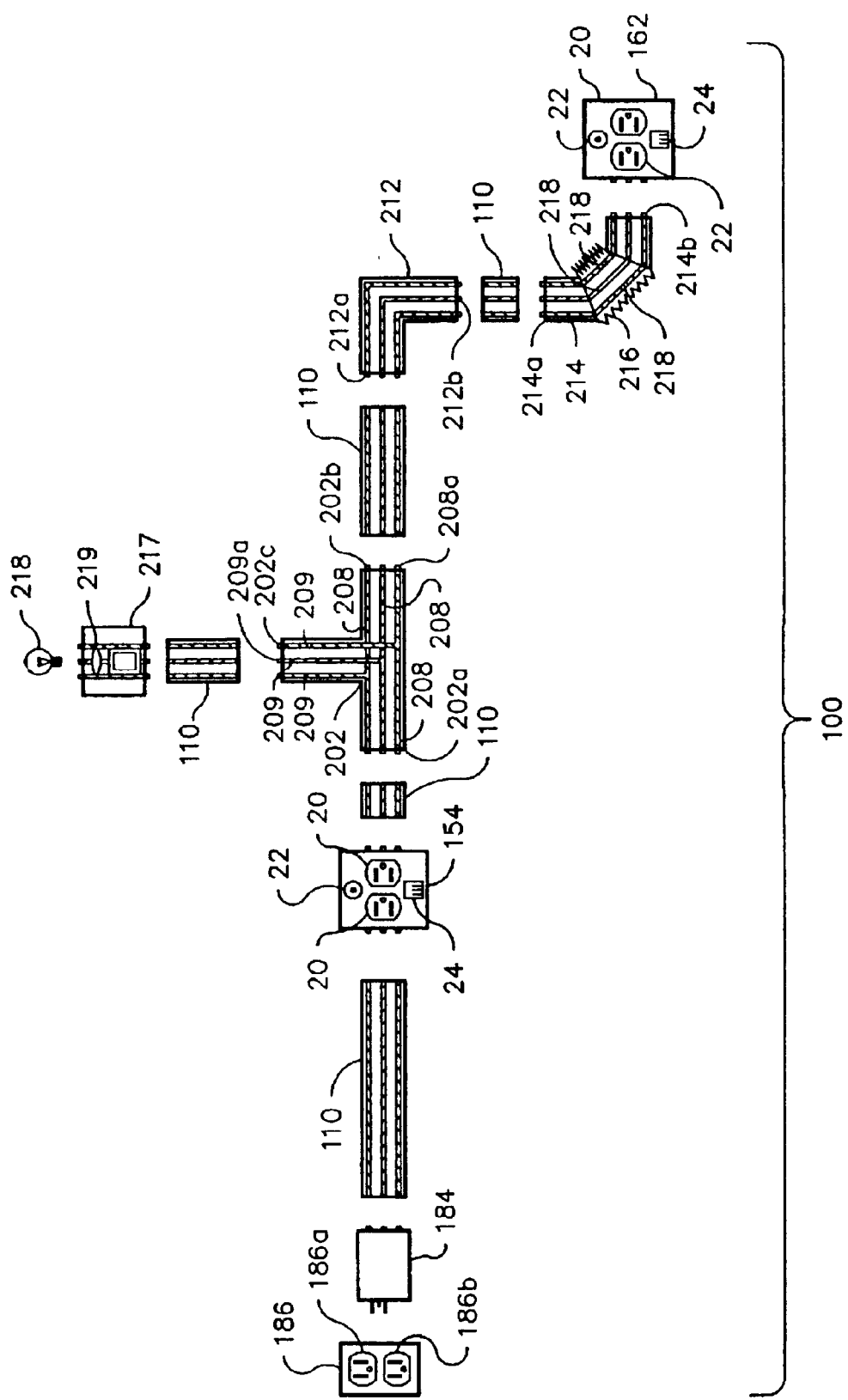
FIG. 5 is a schematic drawing showing additional components of the electrical system.
Figure 6:
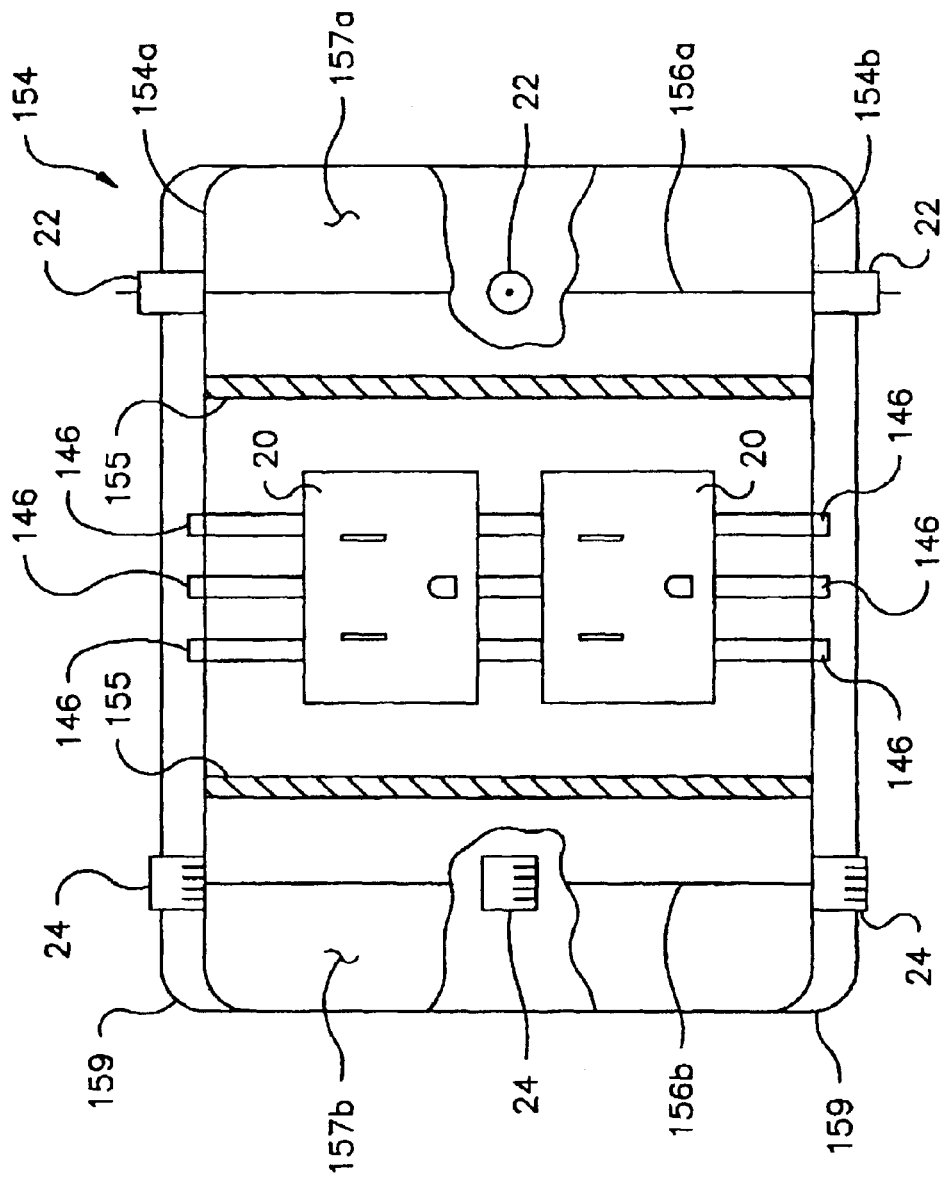
FIG. 6 is a top plan view of an outlet connector with the top partially removed.

FIG. 5 shows a schematic diagram of the system 100 with additional components which will now be described. An alternate version of the connector 136 is an in-line power outlet connector 154, shown in detail in FIG. 6, which includes at least one of an electrical outlet 20, a co-axial connector 22, and a telephone jack 24. Each electric outlet 20 is electrically connected to conductors 146 within the outlet connector 154 such that electrical current flowing through the conductors 146 electrically energize each outlet 20. As shown in FIG. 6, the co-axial connector 22 and the telephone jack 24 each include a mating connector 22 or jack 24, each located on each longitudinal end 154a, 154b of the power outlet connector 154. A co-axial and/or telephone cable 124a, 124b can be run from a remote source (not shown) through the open channels 122, 148 in the carrier member 110 to the power outlet connector 154 and be connected to the connector 22 and/or the jack 24, extending the remote source to the connector 22 or the jack 24. Low voltage conductors 156a, 156b in low voltage channels 157a, 157b in the outlet connector 154 electrically connect the co-axial connector 22 and the telephone jack 24 to the remaining connector 22 and the jack 24, respectively, at each end 154a, 154b of the power outlet connector 154.

The conductors 146 extend from each longitudinal end 154a, 154b of the power outlet connector 154, allowing the system 100 to be extended beyond the outlet connector 154. Each of the low voltage channels 157a, 157b is separated from the power conductors 146 by a wall 155 which extends the length of the power outlet connector 154. The outlet connector 154 includes a top cover (not shown) and a bottom cover 159, located at each end 154a, 154b of the outlet connector 154. The covers engage mating ends of an adjacent carrier member 110 to provide a watertight seal between the outlet connector 154 and the carrier member 110. Although not shown, the power outlet connector 154 can include additional and/or alternate connectors, including, but not limited to, speaker jacks and fiber optic connections.

Figure 7:
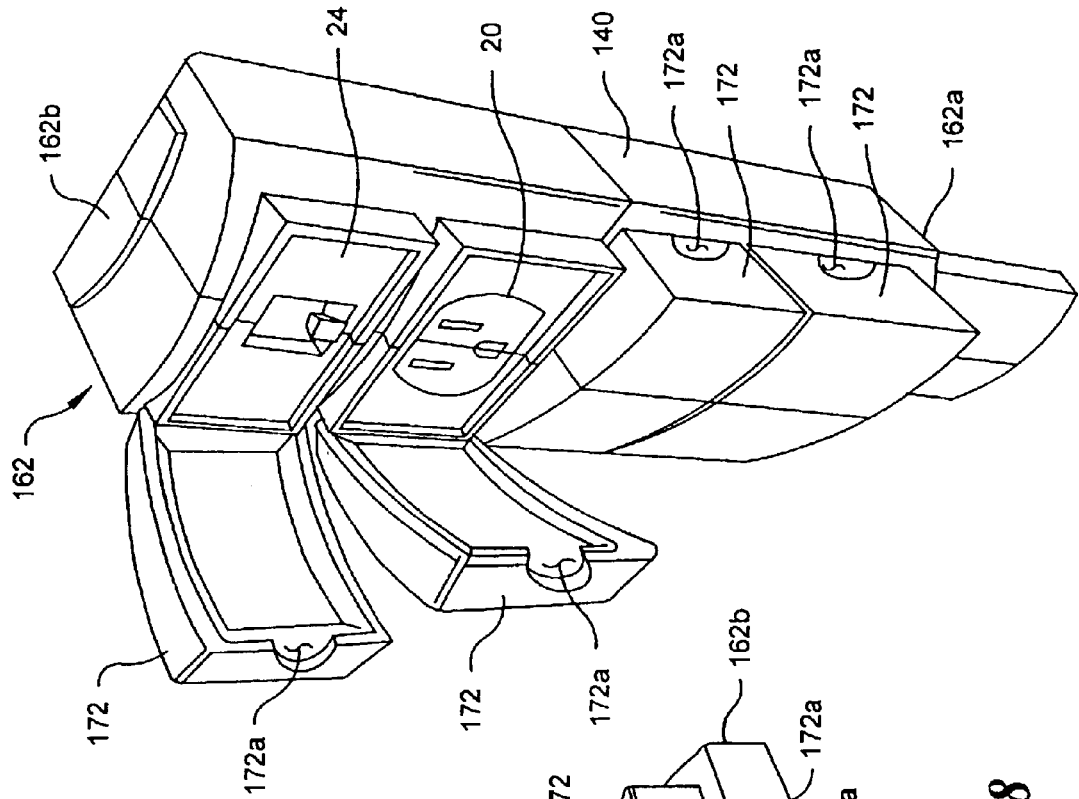
FIG. 7 is a front perspective view of a terminal connector.
Figure 8:
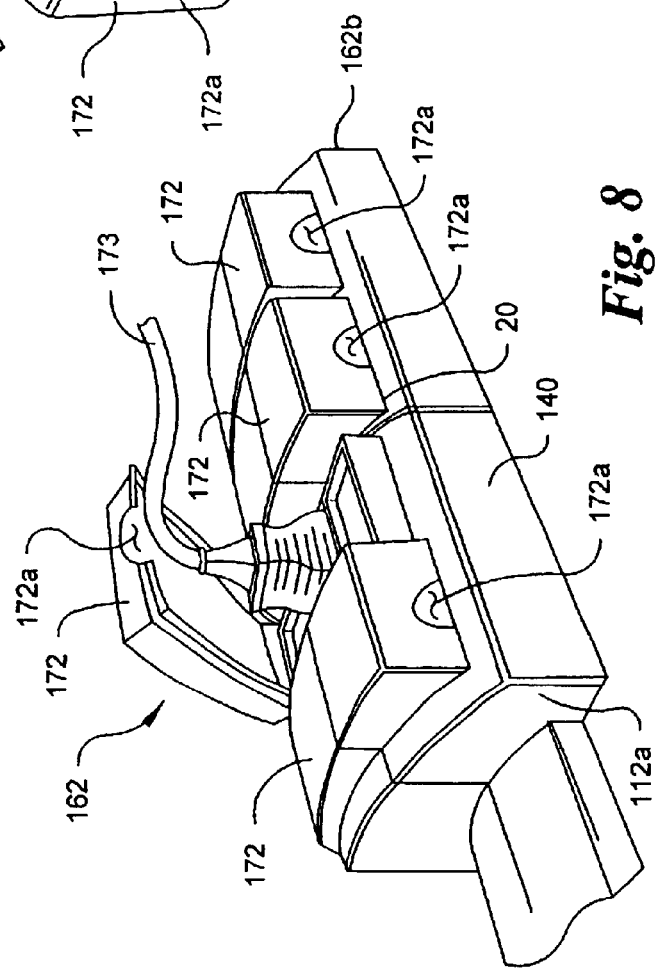
FIG. 8 is a side perspective view of the terminal connector of FIG. 7.
Figure 9:
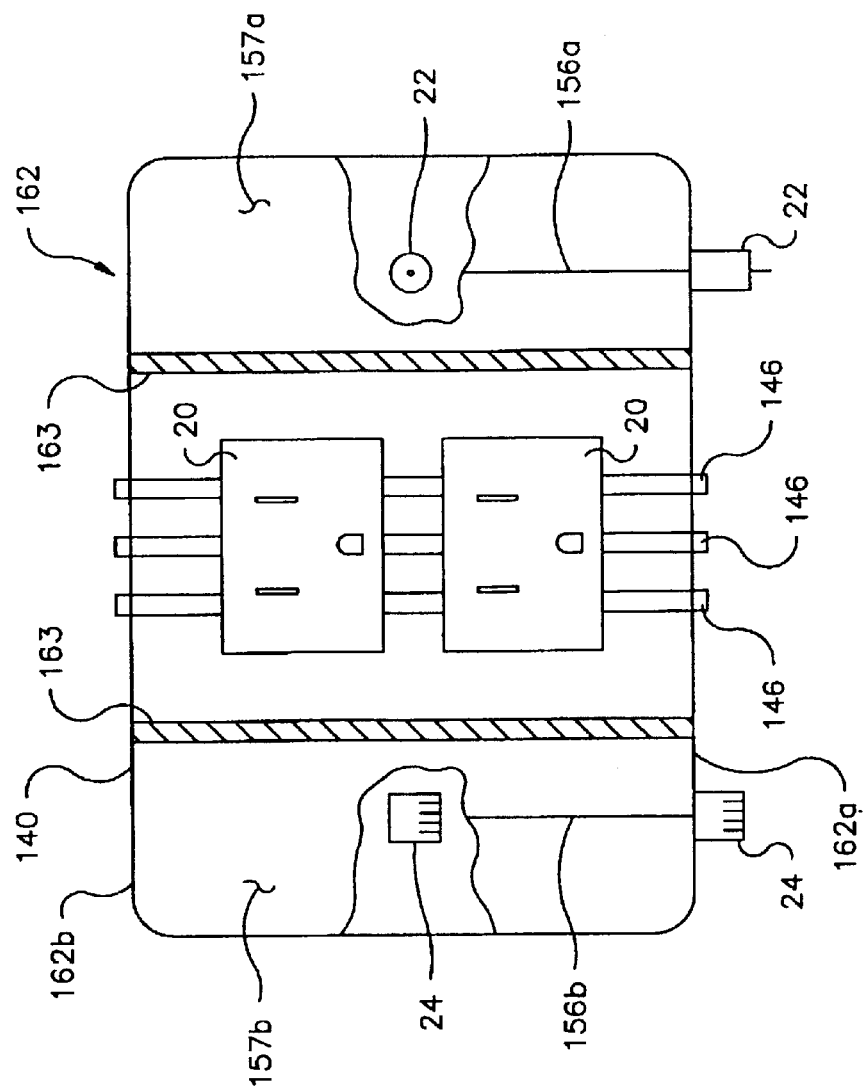
FIG. 9 is a top plan view of an alternate design of the terminal connector with the top partially removed.
Figure 10:
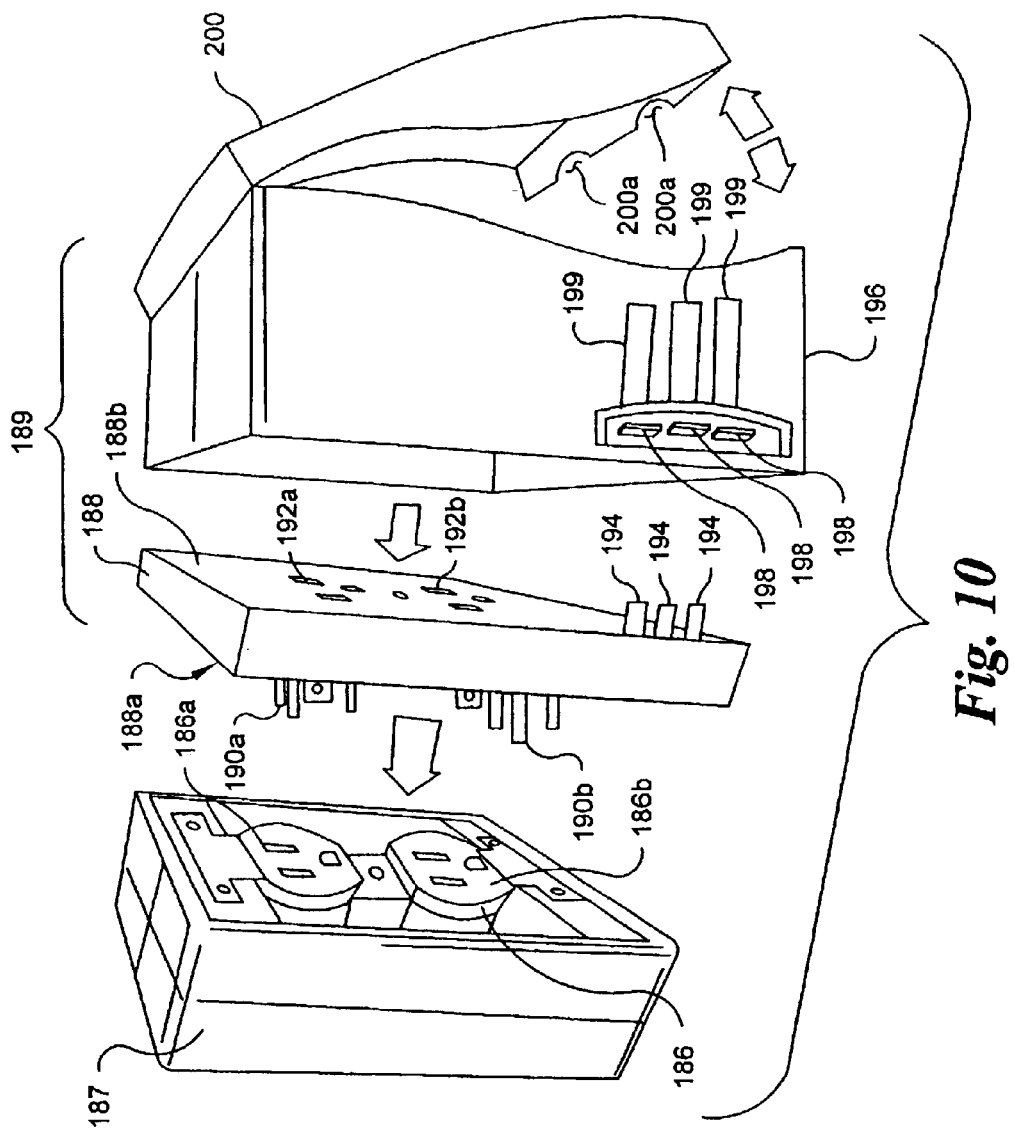
FIG. 10 is an exploded perspective view of an outlet junction box.

Referring now to FIGS. 5 and 7–9, the electrical system 100 further includes a terminating power outlet connector 162 which is similar to the in-line power outlet connector 154. FIGS. 5 and 9 show a preferred configuration while FIGS. 7 and 8 show an alternate configuration. However, the terminating outlet connector 162 includes conductors 146 which extend from only a first end 162a of the outlet connector 162. A second end 162b is not adapted to connect to a carrier member 110 and is electrically sealed by a dielectric member, preferably the same material as the shell 140. The low voltage channels 157a, 157b are separated from the power conductors 146 by a wall 163. Low voltage conductors 156a, 156b electrically connect the co-axial connector 22 and the telephone jack 24 to the corresponding connector 22 and the jack 24, respectively, at the connecting end 162a the outlet connector 162.

Preferably, the outlet 20, connector 22, and jack 24 in both the power outlet connector 154 and the terminating outlet connector 162 are sealingly mounted within their respective housings to maintain watertight integrity.

Both the power outlet connector 154 and the terminating outlet connector 162 include a plurality of cover members 172, shown in FIGS. 7 and 8, with a separate cover member 172 covering each individual outlet 20, connector 22, and jack 24 (only the cover members 172 on the terminating outlet connector 162 are shown, for clarity). Each cover member 172 is preferably hinged to the shell 140 to allow the cover member 172 to be operable between an open position wherein the corresponding outlet 20, connector 22, or jack 24 is exposed and a closed position wherein the corresponding outlet 20, connector 22, or jack 24 is covered. Each cover member 172 includes an opening 172a which allows a cable, such as cable 173 shown in FIG. 8, to extend therethrough, thus allowing the cover member 172 to be fully closed when a cable 173 is inserted into the outlet 20, connector 22, or jack 24. Preferably, when the cover member 172 is in the closed position, the respective outlet 20, connector 22, or jack 24 is surrounded by a watertight seal. Preferably, the cover members 172 include a lock feature (not shown) which can be locked to prevent opening of any or all of the cover members 172.

Referring now to FIGS. 5 and 10–12, the system 100 further includes an outlet junction box 184 which is adapted to connect one of the first and second ends 112a, 112b of the carrier member 110 (not shown for clarity) to an electrical outlet 186 enclosed in a junction box 187. Preferably the electrical outlet 186 includes first and second three-pronged electrical outlets 186a, 186b which are electrically connected to a household electrical power supply. The outlet junction box 184 includes an outlet adapter 188. The outlet adapter 188 is preferably a plate which includes a first and second three-pronged sets 190a, 190b. The first and second three-pronged sets 190a, 190b extend from a rear face 188a of the adapter plate 188 and mate with each of the first and second outlets 186a, 186b, respectively. An optional connector, such as machine screw (not shown), can be used to mechanically connect the outlet adapter 188 to the electrical outlet 186. A front face 188b of the outlet adapter 188 includes first and second three-pronged outlets 192a, 192b. The first and second outlets 192a, 192b preferably are spaced the same distance as the first and second outlets 186a, 186b. With the outlet adapter plate 188 connected to the outdoor outlet 186 (e.g., the first and second three-pronged sets 190a, 190b being inserted into the first and second outlets 186a, 186b, respectively), the first and second plate outlets 192a, 192b are electrically connected to the household power supply. A set of preferably three plate conductors 194 extend outward from the front face 188b of the outlet adapter plate 188. Each of the plate conductors 194 is electrically connected to the first and second three-prong sets 190a, 190b such that the plate conductors 194 are also electrically connected to the household electrical power supply. FIG. 10A shows an alternate embodiment of the adapter plate 188', which includes a co-axial cable connector 22 and a telephone jack 24. The adapter plate 188' allows the user to connect low voltage cables at the adapter plate 188' and run the cables through the open channels 122 of a connected carrier member 110.

Figure 11:
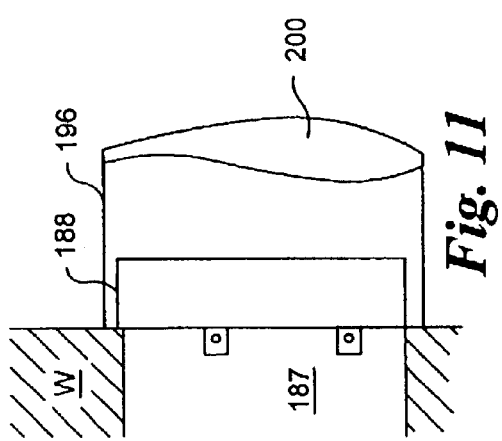
FIG. 11 is a cutaway side profile view of the outlet junction box of FIG. 10 mounted on a flush-mounted house junction box.
Figure 12:
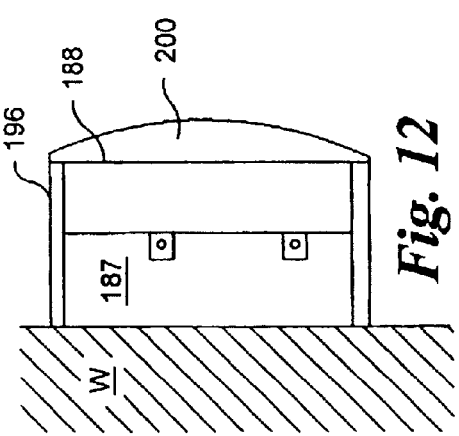
FIG. 12 is a cutaway side profile view of the outlet junction box of FIG. 10 mounted on an externally mounted house junction box.

The outlet junction box 184 further includes a cover box 196 which is adapted to fit over the outlet adapter plate 188 and at least part of the junction box 187. If the junction box 187 is recessed within a wall W as shown in FIG. 11, the cover box 196 covers only the outlet adapter plate 188. If the junction box 187 is mounted to the wall W such that the junction box extends outward from the wall W as shown in FIG. 12, the cover box 196 covers the outdoor outlet adapter plate 188 and the exposed part of the junction box 187, as well. The cover box 196 includes cover box conductors 198 which are mounted such that when the cover box 196 is installed over the outlet adapter plate 188, the plate conductors 194 are electrically connected to the cover box conductors 198. Free ends of the cover box conductors 198 are insertable into the open spaces 120a, 120b, 120c in the carrier member 110 for conductive contact with the conductors 118a, 118b, 118c. Those skilled in the art will recognize from the present disclosure that the electrical outlet 186, the outlet adapter plate 188, and the cover box 196 can be mechanically connected to each other by known means, including but not limited to, screws (not shown) or other known connecting devices.

Preferably, extension conductors 199 engage the plate conductors 194 regardless of whether the cover box 196 is mounted on the junction box 187 recessed within the wall W (FIG. 11) or mounted on the wall W (FIG. 12). Alternatively, a cheater cover (not shown) can be installed over a wall mounted junction box 187 to align the cover box conductors 198 with the plate conductors 194 without the need for the conductor extensions 199. Preferably, the cover box conductors 198 are recessed within the cover box 196 such that the cover box conductors 198 do not extend beyond the sidewall of the cover box 196. Although the cover box conductors 198 are located along the sidewall of the cover box 196, those skilled in the art will recognize that the cover box conductors 198 can extend along the top or bottom walls of the cover box 196 as well.

The cover box 196 further includes a cover plate 200 which is hingedly connected to the cover box 196. The cover plate 200 is pivotable between a first closed position covering the plate outlets 192a, 192b and a second, open position exposing the plate outlets 192a, 192b. The cover plate 200 includes a plurality of recesses 200a in the bottom of the cover plate 200 which are sized to allow an electrical cord (not shown) of a device plugged into either of the three-pronged outlets 192a, 192b to pass through one of the recesses 200a and still allow the cover plate 200 to fully close.

Figure 13:
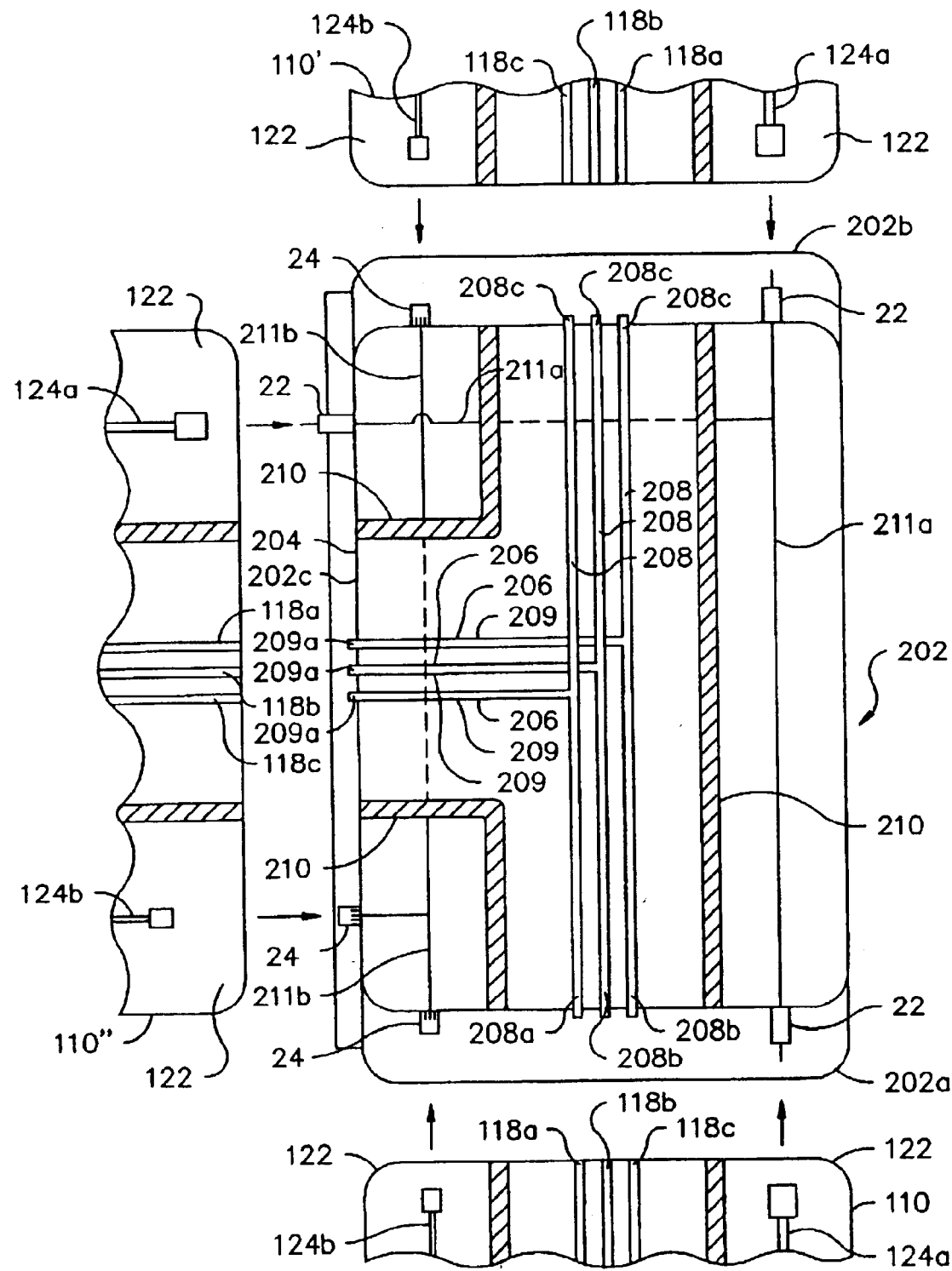
FIG. 13 is a top plan view of a T-connector and three connecting carrier members with the tops removed.

Referring to FIGS. 5 and 13, a "T-connector" 202 can be used to connect two adjacent carrier members 110, 110' to each other and to also electrically connect a third carrier member 110" to the electrical system 100. The T-connector 202 comprises an extension portion 204 which extends from the T-connector 202 between first and second connector ends 202a, 202b and terminates at a third, or extension end 202c. The extension portion 204 includes a like plurality of enclosed channels 206 as conductor channels 116a, 116b, 116c in the carrier members 110. A conductor 208 extends though each enclosed channel 206 between the first end 202a and the second end 202b and terminates at a conductor end 208a, 208b, respectively. An extension conductor 209 extends from each conductor 208 and terminates at an end 209a at the free end of the extension portion 204. Each conductor end 208a, 208b and each extension end 209a is electrically connectable to a carrier member 110 in a manner similar to the conductors 146.

Referring to FIG. 13, the T-connector 202 also includes a low voltage interface at each end 202a, 202b. Each interface 202a, 202b includes a connector 22, 24 for a co-axial cable and a telephone cable 124a, 124b, respectively. Each connector 22, 24 is electrically connected to the two remaining like connectors 22, 24 on the T-connector 202 through low voltage cables 211a, 211b embedded in the T-connector 202. Walls 210 maintain a separation between the conductors 208 and the cables 211a, 211b so that the conductors 208 and the cables 211a, 211b are shielded from each other. Where the cables 211a, 211b cross the conductors 208, the cables 211a, 211b extend underneath and/or over the top of the conductors 208, with the wall 210 maintaining separation between the conductors 208 and the cables 211a, 211b.

Preferably the extension 204 extends generally perpendicular to a longitudinal axis 210 of the T-connector 202. However, those skilled in the art will recognize that the extension 204 can extend from the T-connector 202 at angles other than perpendicular. Additionally, although not shown, an "X-connector" can be used as well in addition to or instead of the T-connector 202.

Referring to FIG. 5 only, an angled connector 212 can also be used to redirect adjacent carrier members 110. The angled connector 212 includes a first end 212a and a second end 212b. Preferably, a plane of the first end 212a is generally perpendicular to a plane of the second end 212b. In other words, the angled connector 212 turns a 90° angle between ends 212a, 212b. Although FIG. 5 shows the angled connector 212 to be angled parallel to the plane of the paper, those skilled in the art will recognize that the angled connector 212 can be angled out of the plane of the paper as well.

Still referring to FIG. 5, an alternate embodiment adjustable angled connector 214 includes a flexible central portion 216 such that an angle formed by a plane of the first connector end 214a and the second connector end 214b is adjustable. The flexible central portion 216 can be generally accordion-shaped or of other suitable design to allow the central portion 216 to flex. Preferably, the conductors 218 located within the central portion 216 are flexible or adjustable to accommodate different angles between the first and second ends 214a, 214b, respectively. Although FIG. 5 shows the adjustable angled connector 214 to be angled parallel to the plane of the paper, those skilled in the art will recognize that the adjustable angled connector 214 can be angled out of the plane of the paper as well.

Still referring to FIG. 5, a light fixture 217 with a lightbulb 218 can be connected to the carrier member 110. The fixture 217 is electrically connectable to the conductors 118a, 118b, 118c to electrically connect the fixture 217 to the electrical power source. The light bulb 218 is replaceably connectable to the fixture 217 in a known manner. Preferably, but not necessarily, a sensor 219 can be electrically connected to the fixture 217 to automatically turn on/off the lightbulb 218 under predetermined specifications, such as time or ambient brightness. Additionally or alternatively, a mechanical timer or an ON/OFF switch can be used.

Preferably, the components of the electrical system 100 described above are constructed of a rubberized or flexible plastic to allow at least nominal bending of the carrier member 110, the connectors 136, 154, 162, and/or the angled connectors 212, 214 although those skilled in the art will recognize that the components of the electrical system 100 can be constructed of various other dielectric material.

To install the conductor system 100, a user first turns off electrical power to the electrical outlet 186 and removes any existing outlet covers from the outlet 186 at which the system 100 is to be installed. The user then installs the outlet adapter plate 188 on the electrical outlet 186, and then installs the cover box 196 over the outlet adapter plate 188. The user then connects a first end 112a of a carrier member 110 to the cover box conductors 198.

Preferably, the carrier member 110 is provided in a standard length, as described above. However, the carrier member 110 can be custom cut by the user to fit any other size. After the user determines the length required, the user cuts the carrier member 110 generally perpendicularly to the longitudinal axis 114 and parallel to the planes of the first and second ends 112a, 112b. The user then connects the connector 136 to either the first or second end 112a, 112b of the carrier member 110, inserting a connector conductor 146a, 146b, 146c into a respective conductor channel 116a, 116b, 116c and establishing electrical connections between the connector conductors 146a, 146b, 146c and the conductors 118a, 118b, 118c. The process is repeated for the other of the first and second ends 112a, 112b. The user uses the mounting brackets 128 to mount the system 100 to a surface S.

When the user desires to turn the direction of the system 100 or add a tee connection, the user connects the T-connector 202, the angled connector 212 or the adjustable angled connector 214 to one of the first and second ends 112a, 112b of a carrier member 110. When the user desires to provide an electrical connection, the user connects one of the connectors 154, 162 to one of the first and second ends 112a, 112b of a carrier member 110. When the user desires to provide a light, the user connects the light fixture 217 to one of the first and second ends 112a, 112b of a carrier member 110. Preferably, the user terminates the system 100 with a terminating outlet connector 162 or a light fixture not shown.

After the system 100 is connected, the user can run a plurality of low voltage cables 124a, 124b along the open channels 122, 148 of the carrier member 110 and connector 136, respectively, connecting the low voltage cables 124a, 124b to connectors 22 and jacks 24 in T-connectors 202, power connectors 154 and terminating connectors 162.

Referring now to FIGS. 14–16, the terminating outlet connector 162 described above can be adapted as a modular outlet assembly 300 to be connected directly into the outdoor outlet 186 or any other electrical outlet 20 by means of a well-known three-pronged electrical plug 302. The modular outlet assembly 300 includes at least a first electrical power outlet 320 and at least one of a second electrical power outlet 321, a co-axial cable connector 322 (shown in dashed lines) and a telephone jack 324. Each of the electrical power outlets 320, 321, the co-axial cable connector 320, and the telephone jack 322 includes a cover 372 adapted to cover its respective outlet 320, 321, connector 322, or jack 324. Each cover 372 is hingedly connected to the assembly 300 so as to be operable between an open position wherein the outlet 320, 321 connector 322, or jack 324 is exposed and a closed position wherein the outlet 320, 321, connector 322, or jack 324 is covered. Preferably, the cover 372 seals its respective outlet 320, 321, connector 322, or jack 324 in the closed position, providing a watertight seal. Preferably, the outlets 320, 321, connector 322, and jack 324 in the assembly 300 are sealingly mounted within their respective housings to maintain watertight integrity. Also preferably, the cover members 372 include a lock feature (not shown) which can be locked, either individually or as a group, to prevent unauthorized opening of any of the cover members 372.

As shown in FIG. 14, the assembly 300 further includes an electrical power cable 310 having a first end 310*a* and a second end 310*b*. The first end 310*a* is connected to at least one of the first and second electrical power outlets 320, 321 and the second end 310*b* includes the electrical plug 302, which is adapted to be connected to an electrical outlet, such as either of the first and second outlets 186*a*, 186*b* or another outlet 20. The power cable 310 includes a plurality of clips 312 connected thereto. The clips 312 are adapted to support at least one conductor cable, preferably a low voltage conductor, such as coaxial cable 124*a* or telephone cable 124*b*. The assembly 300 preferably has a flat rear surface 300*a* for mounting the assembly 300 onto a support surface, such as flat deck post (not shown). The rear surface 300*a* further includes a plurality of keyholes 314. The keyholes 314 allow the assembly 300 to be removably mounted on a like plurality of screws, nails, hooks, or other supports extending from the support surface. Alternatively, the assembly 300 can be mounted to a stake (not shown) and embedded in a ground surface.

Referring now to FIG. 16, the assembly 300 includes open channels 330 which allow cables 124*a*, 124*b* to be run along the assembly 300 from an open end 330*a* to a closed end 330*b*, where connectors (not shown) similar or identical to the connector 22 and the jack 24 shown in FIG. 6 connect the cables 124*a*, 124*b* to the assembly 300 so that the cable 124*a* is electrically connected to the connector 320 and the cable 124*b* is electrically connected to the jack 324 by low voltage cables (not shown).

To operate the assembly 300, the user plugs the plug 302 into an electrical power source. The user then extends the assembly 300 away from the power source and connects the assembly 300 to a surface S (not shown). The user runs low voltage cable(s) 124*a*, 124*b* along the power cable 310, connecting the low voltage cable(s) 124*a*, 124*b* to the power cable 310 using the clips 312. The user then plugs the low voltage cables 124*a*, 124*b* into the connector and/or the jack in the open channels 330 in the assembly 300. The user can then extend electrical power and low voltage electricity from the outlets 320, 321, the connector 322, and the jack 324.

The open channel raceway system 400, shown in FIGS. 17–25, includes at least one carrier member 412 which includes first and second carrier member ends 412*a*, 412*b*, respectively. The carrier member 412 is constructed of a dielectric shell 414 and includes at least one enclosed carrier channel 416 extending between the first and second ends 412*a*, 412*b* and is adapted to receive at least one power cable 418 extending therethrough.

The modular carrier system 400 further includes a connector key 420 which extends from the at least one enclosed carrier channel 416 at one of the first and second ends 412*a*, 412*b*. The connector key 420 includes a key channel 422 which extends longitudinally through the connector key 420 such that the enclosed carrier channel 416 is in communication with the key channel 422. Preferably, the interface of the connector key 420 with the at least one carrier member 412 forms a sealed connection between the connector key 420 and the at least one carrier member 412. More preferably, the at least one carrier member 412 and the connector key 420 are integrally formed. However, those skilled in the art will recognize that the at least one carrier member 412 and the connector key 420 can be two separate pieces.

Figure 18:
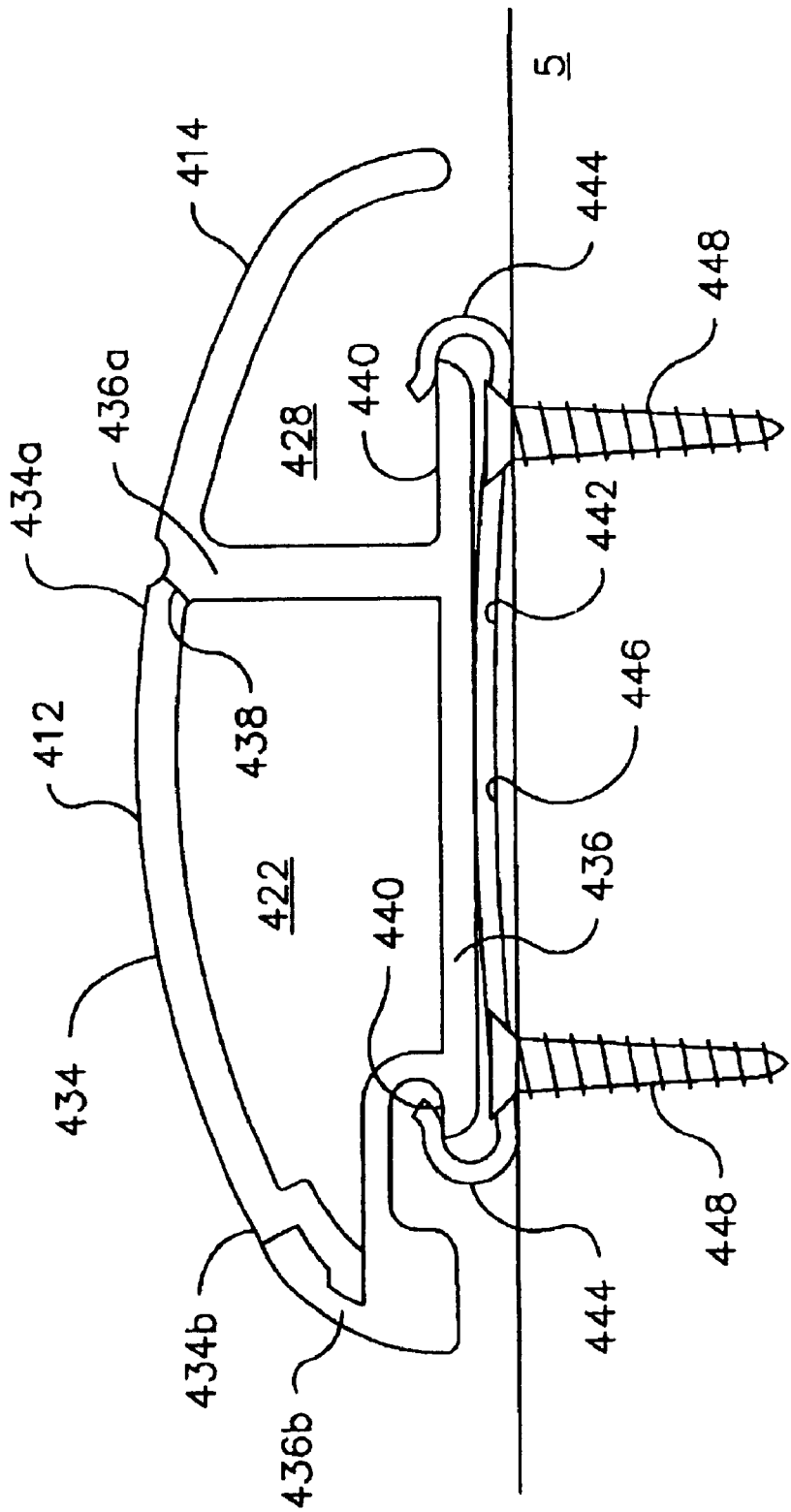
FIG. 18 is an end profile view of a raceway section of the raceway assembly of FIG. 17.
Figure 18A:
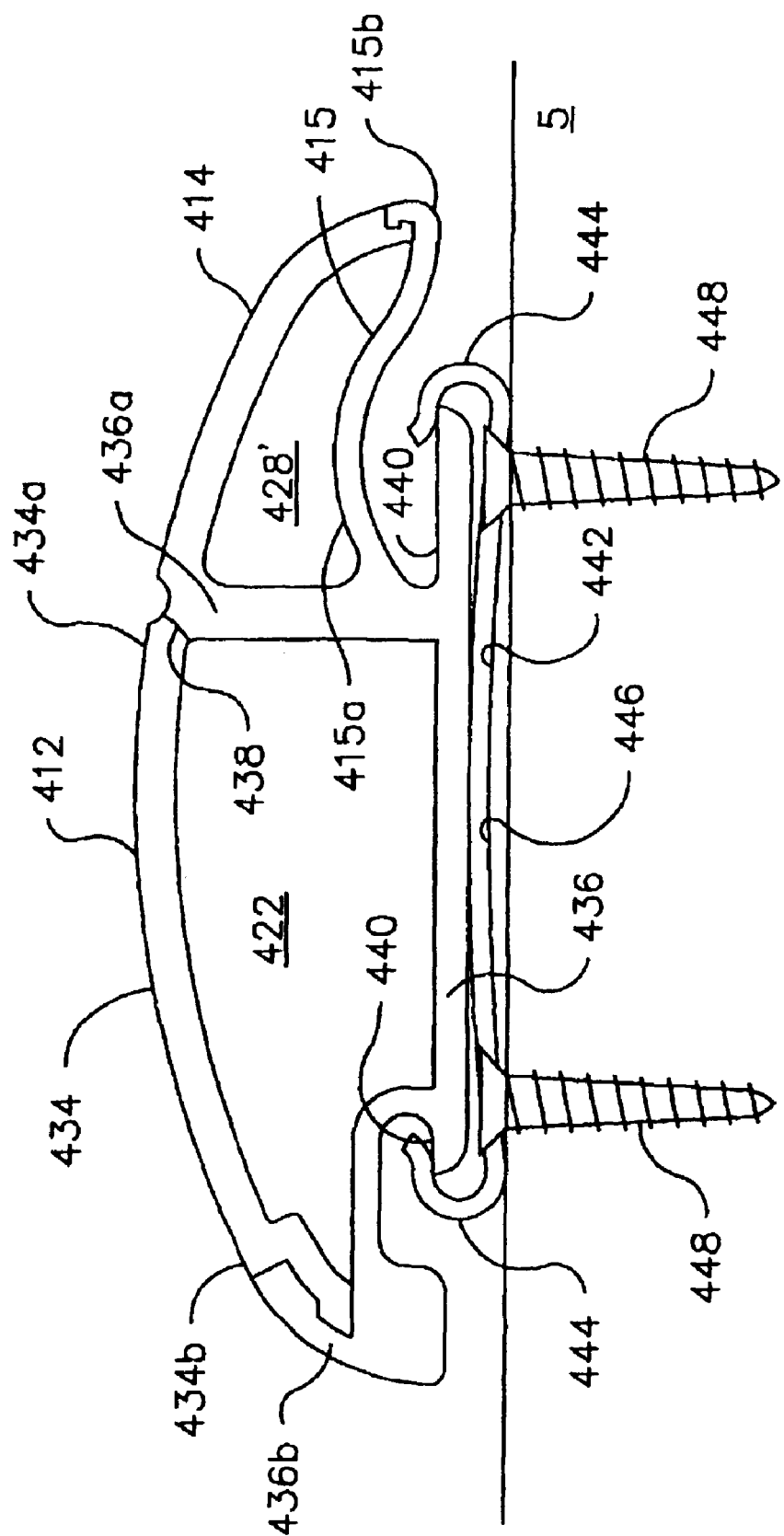
FIG. 18A is an end profile view of an alternate embodiment of the raceway section of the raceway assembly of FIG. 17.

Referring to FIG. 18, the carrier member 412 further includes at least one open carrier channel 428 which is adapted to receive at least one conductor cable, preferably a low voltage conductor 124*a*, 124*b*, such as coaxial cable 124*a* or telephone cable 124*b*, extending therethrough. Referring to FIG. 18A, in an alternate embodiment, the carrier member 412 includes at least one openable carrier channel 428' having a perimeter formed by the dielectric shell 414 and a closure 415. The closure 415 has a first end 415*a* in union with the shell 414 and a second end 415*b* that is separable from the shell 414 to provide access to the at least one openable carrier channel 428'.

Although the enclosed carrier channel 416 can be a single, continuous piece around the entire circumference, preferably, the enclosed carrier channel 416 includes a first longitudinal portion 434 having first and second sides 434*a*, 434*b* and a second longitudinal portion 436 having first and second sides 436*a*, 436*b*. The first side 434*a* of the first portion 434 is connected to the first side 436*a* of the second portion 436. A living hinge 438 is formed at the connection between the first side 434*a* of the first portion 434 and the first side 436*a* of the second portion 436. The second side 434*b* of the first portion 434 is connectable with the second side 436*b* of the second portion 436 to form a sealed connection. The first end 436*a* of the first portion 436 also forms a barrier between the enclosed channel 416 and the open channel 428.

Similarly, the connector key 420 includes a first longitudinal portion 424 having first and second sides 424*a*, 424*b* and a second longitudinal portion 426 having first and second sides 426*a*, 426*b*. The first side 424*a* of the first portion 424 is connected to the first side 426*a* of the second portion 426. A living hinge 428 is formed at the connection between the first side 424*a* of the first portion 424 and the first side 426*a* of the second portion 426. The second side 424*b* of the first portion 424 is connectable with the second side 426*b* of the second portion 426 to form a sealed connection.

The second sides 434*b*, 424*b* of the first portions 434, 424 of the at least one carrier member 412 and the connector key 420 and the second sides 436*b*, 426*b* of the second portions 436, 426 of the at least one carrier member 412 and the connector key 420 are separable from each other sufficiently to allow insertion of the power cable 418 within the channels 416, 422. With the second sides 434*b*, 424*b* of the first portions 434, 424 of the at least one carrier member 412 and the connector key 420 separated from the second sides 436*b*, 426*b* of the second portions 436, 426 of the at least one carrier member 412 and the connector key 420, the power cable 418 can be inserted into the channels 416, 422 of the at least one carrier member 412 and the connector key 420. After the power cable 418 is inserted into the channels 416, 422, the second ends 434*b*, 424*b* of the first portions 434, 424 of the at least one carrier member 412 and the connector key 420 can be engaged with the second ends 436*b*, 426*b* of the second portions 436, 426 of the at least one carrier member 412 and the connector key 420 to form the sealed connection.

Referring now to FIGS. 17 and 18, the shell 412 further includes mounting lips 440 which preferably extend the length of the shell 422. The lips 440 preferably form part of the open channel 428. A mounting bracket 442 includes tangs 444 at either end which are adapted to engage the mounting lips 440. A connecting portion 446, is located generally between and connects the tangs 444. At least one fastener 448 extends through the connecting portion 446 for mounting the mounting bracket 442 and the shell 422 to a surface S. Preferably, the fastener 448 is a nail or a screw, although those skilled in the art will recognize that other fasteners, including adhesives, can be used.

Figure 19:
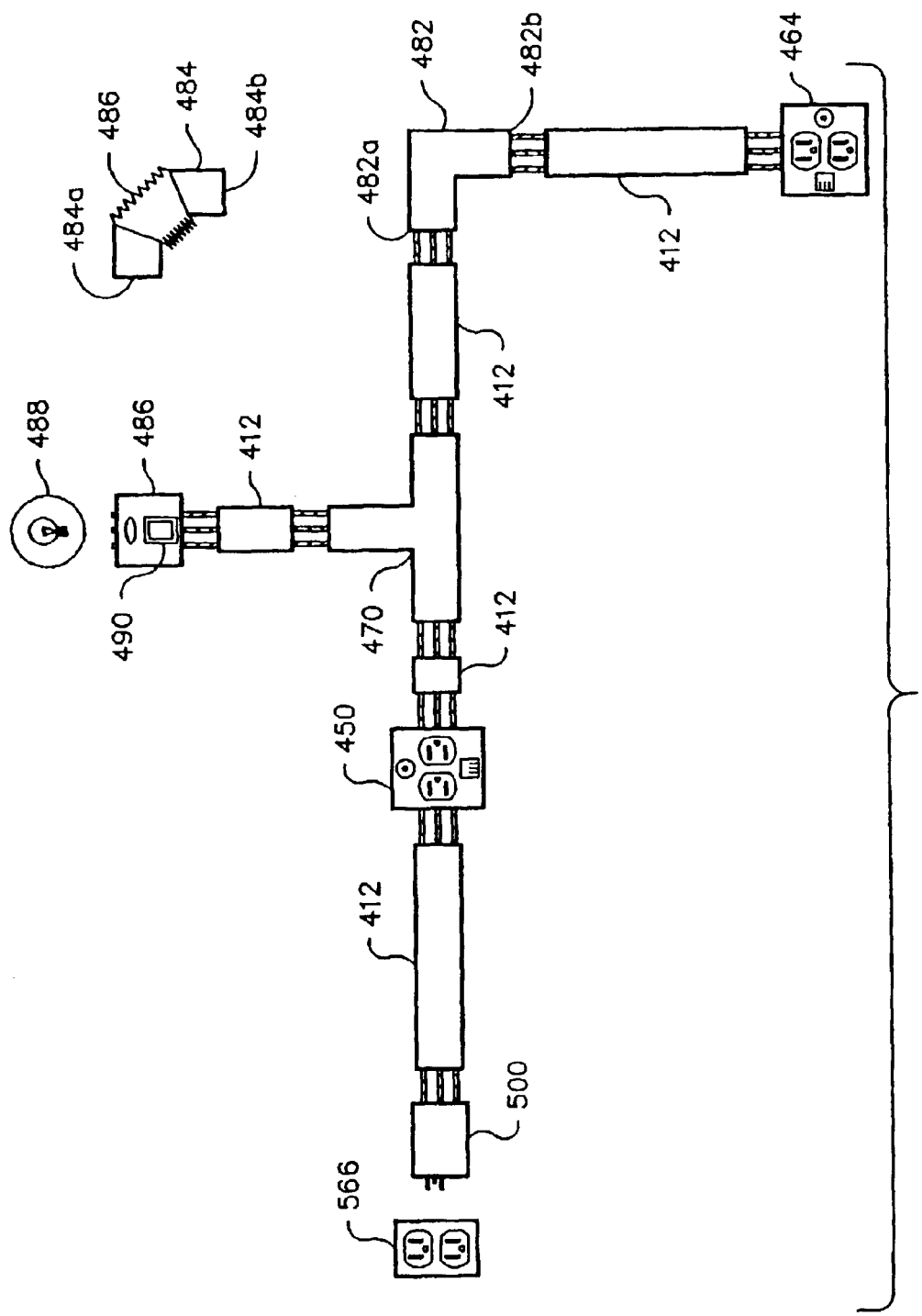
FIG. 19 is a schematic view showing additional components of the raceway assembly.
Figure 20:
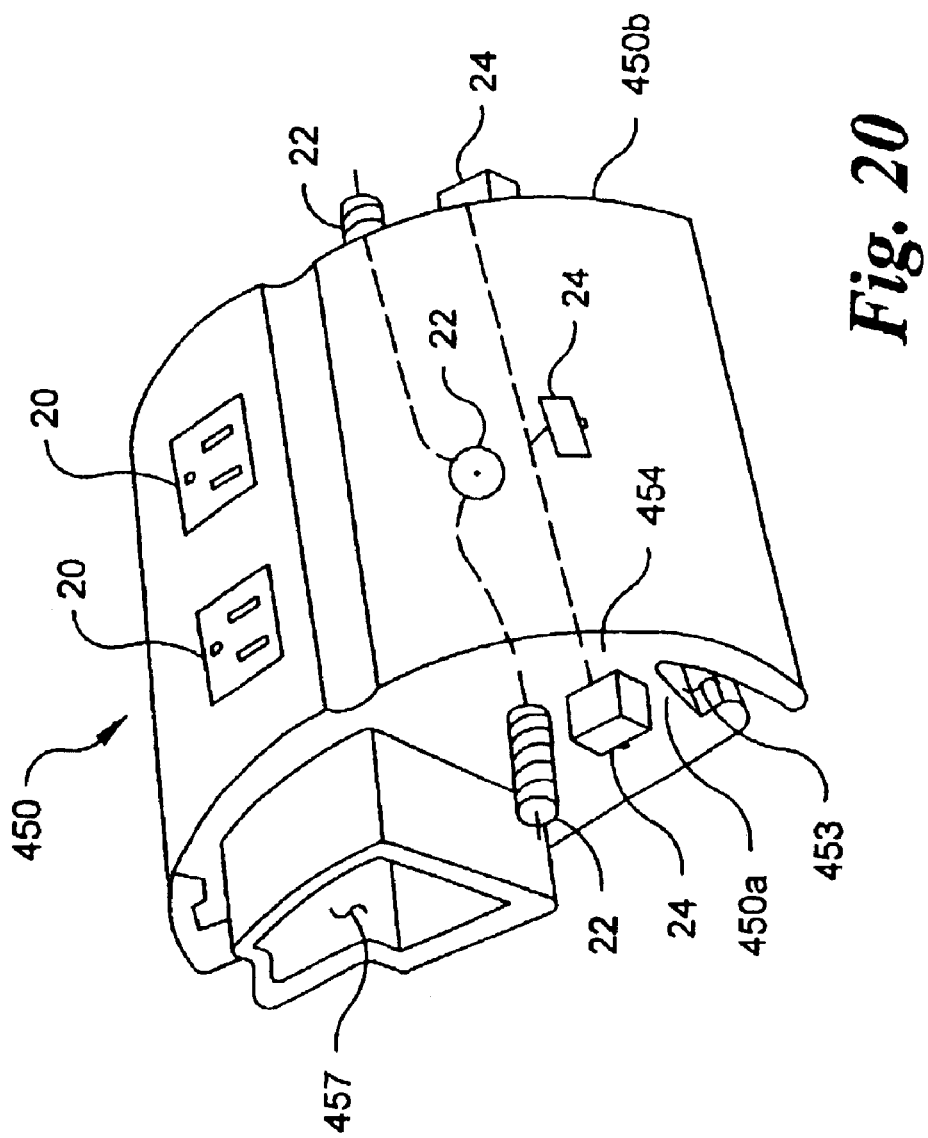
FIG. 20 is a perspective view of an outlet section of the raceway assembly, with outlet covers removed for clarity.

FIG. 19 shows a schematic view of the elements that make up the system 400, which will now be described in detail. As shown in FIG. 20, a outlet connector 450 includes a connection for at least one of electrical power, telephone, and coaxial cables. For the electrical power cables, the outlet connector 450 is in communication with the enclosed channel 422 and terminates in at least one, and preferably two, electrical outlets 20. For the telephone and coaxial cables 124a, 124b, the cables 124a, 124b are in communication with a low voltage connector channel 454 and the connection terminates in one of a coaxial cable connector 22 and a telephone jack 24 at each end 450a, 450b and on the top surface of the outlet connector 450. An open channel 453 can extend the length of the outlet connector 450 to extend any low voltage cables 124a, 124b not being connected to the outlet connector 450.

Figure 21:
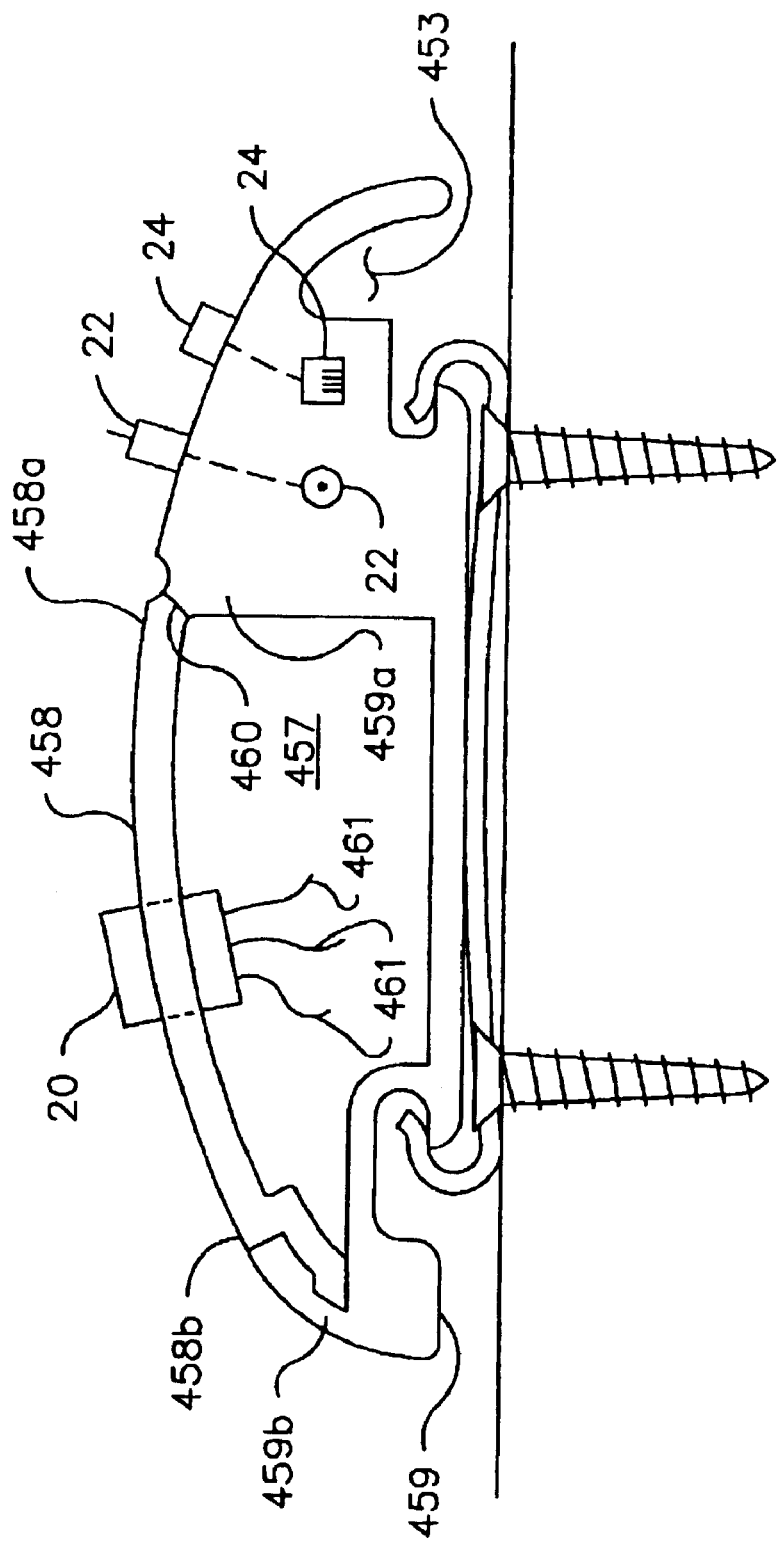
FIG. 21 is an end profile view of the section shown in FIG. 20.
Figure 22:
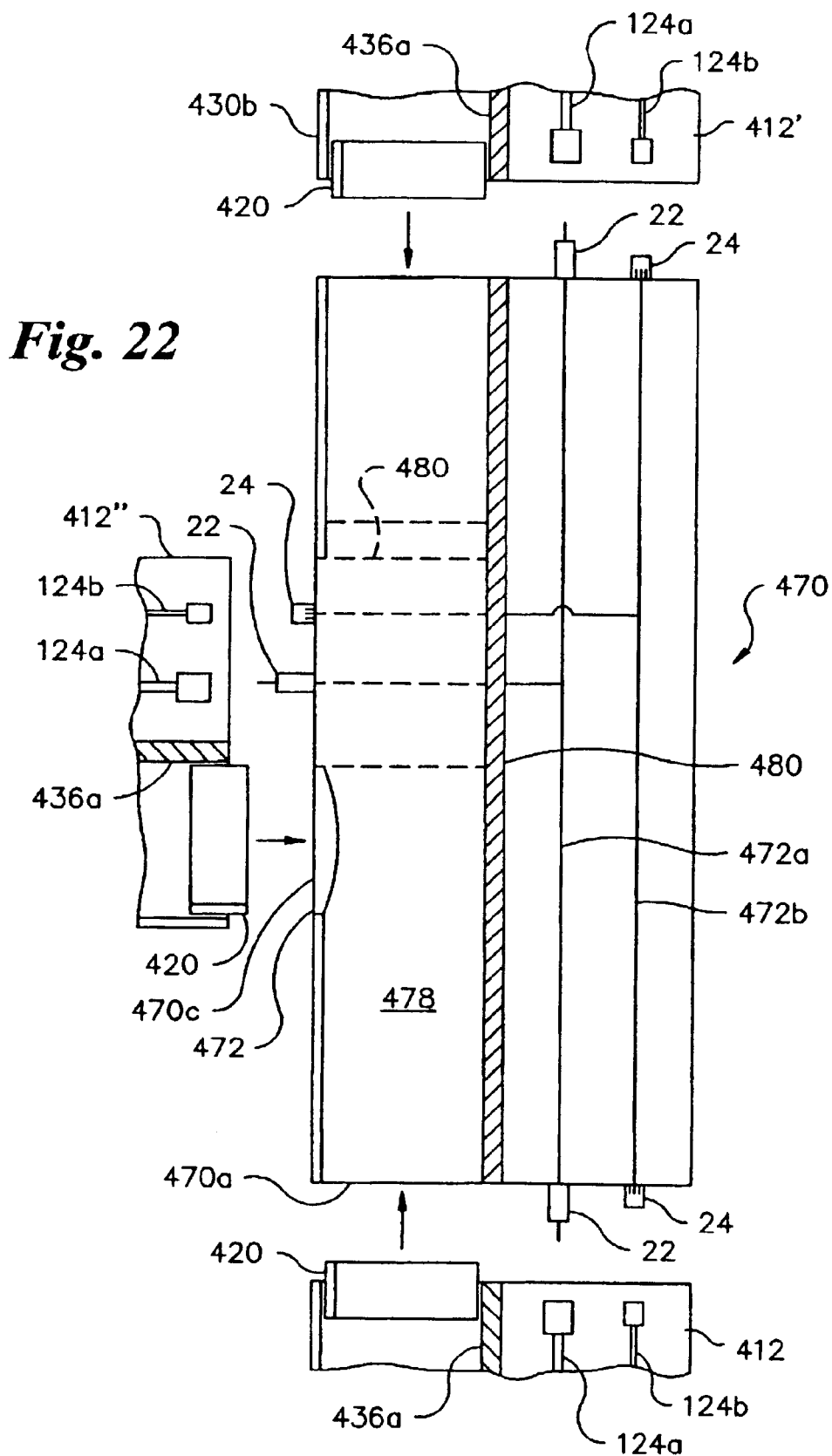
FIG. 22 is a top plan view of a T-connector and three connectors with the tops removed.

Similar to the enclosed carrier channel 416, the outlet connector 450, shown in perspective in FIG. 20 and in an end profile view in FIG. 21, includes an enclosed carrier channel 457 which includes a first longitudinal portion 458 having first and second sides 458a, 458b and a second longitudinal portion 459 having first and second sides 459a, 459b. The first side 458a of the first portion 458 is connected to the first side 459a of the second portion 459. A living hinge 460 is formed at the connection between the first side 458a of the first portion 458 and the first side 459a of the second portion 459. The second side 458b of the first portion 458 is connectable with the second side 459b of the second portion 459 to form a sealed connection.

The first longitudinal portion 458 includes at least one, and preferably two, electrical outlets 20 mounted thereon. Electrical conductors 461 extend from the electrical outlets 20 for connection to the power cable 418 being run through the enclosed carrier channel 416. The enclosed carrier channel 457 can be opened by separating the second side 458b of the first longitudinal portion 458 from the second side 459b of the second longitudinal portion 459 and connecting free ends of a power cable 418 with the electrical conductors 461. A second power cable 418 (not shown) can also be connected to the electrical conductors 461, extending the electrical power line from the other end of the outlet connector 450.

Figure 20A:
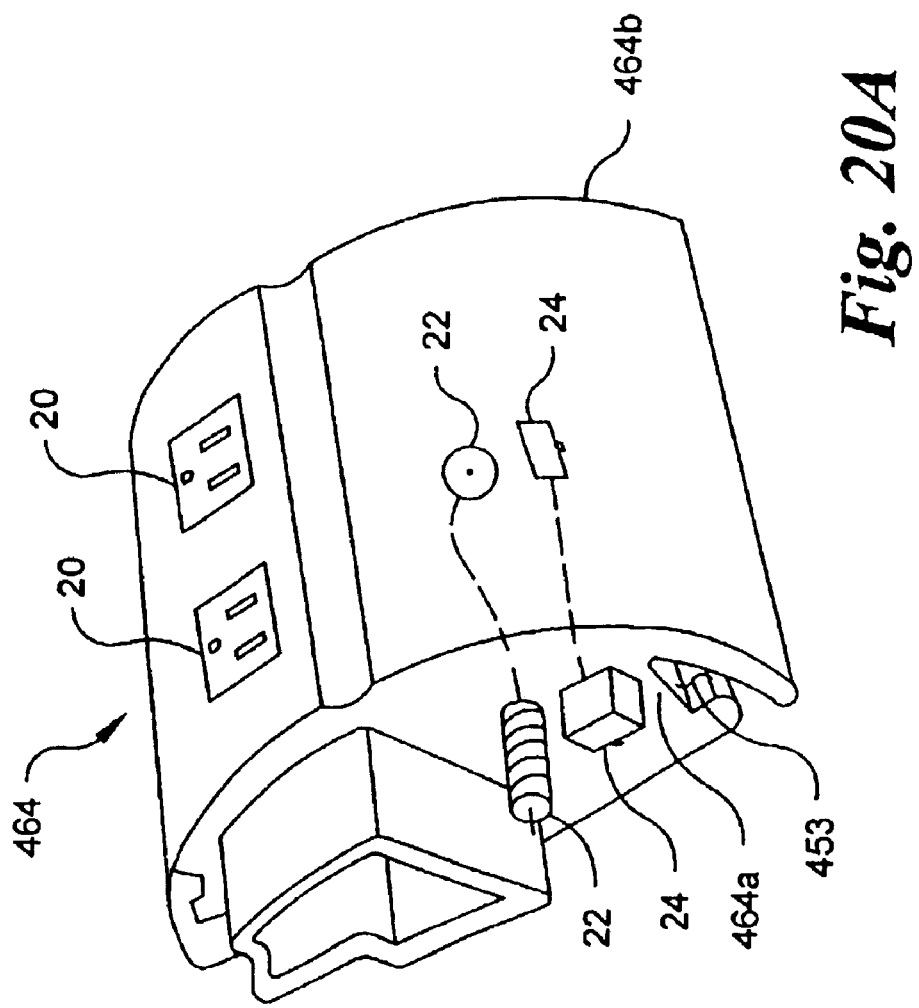
FIG. 20A is a perspective view of a terminating outlet section of the raceway assembly, with outlet covers removed for clarity.

As shown in FIG. 20A, a terminating connector 464 is similar to the outlet connector 450, but includes only a connector 22 and a jack 24 at a first end 464a electrically connected to a connector 22 and a jack 24 fixed to the top of the end terminating connector 464. A second end 464b is closed over the entire length of the end 464b.

Referring back to FIG. 19, other elements of the system 400 will now be described. A "T-connector" 470, shown in plan view in FIG. 22, can be used to connect two adjacent carrier members 412, 412' to each other and to also electrically connect a third carrier member 412" to the system 400. The T-connector 470 comprises an extension portion 472 which extends from the T-connector 470 between first and second connector ends 470a, 470b and terminates at a third, or extension end 470c. The extension end 470c is in communication with an enclosed channel 478 extending between the first connector end 470a and the second connector end 470b.

The T-connector 470 also includes a low voltage interface at each end 470a, 470b, 470c. Each end 470a, 470b, 470c includes a connector 22, 24 for a co-axial and a telephone cable 124a, 124b, respectively. Each connector 22, 24 is electrically connected to the two remaining like connectors 22, 24 on the T-connector 470 by low voltage cables 472a, 472b integral in the T-connector 470 to continue the cables 124a, 124b out the remaining ends 470a, 470b, 470c of the T-connector 470. A wall 480 maintains a separation between the enclosed channel 478 and the cables 472a, 472b. Where the cables 472a, 472b cross the enclosed channel 478, the cables 472a, 472b extend underneath and/or over the top of the enclosed channel 478, with the wall 480 maintaining separation between the enclosed channel 478 and the cables 472a, 472b. Additionally, although not shown, an "X-connector" can be used as well in addition to or instead of the T-connector 470.

Referring back to FIG. 19, an angled connector 482 can also be used to redirect adjacent carrier members 212. The angled connector 482 includes a first end 482a and a second end 482b. Preferably, a plane of the first connector end 482a is generally perpendicular to a plane of the second connector end 482b. In other words, the angled connector 480 turns a 90° angle between ends 482a, 482b. Although FIG. 19 shows the angled connector 480 to be angled within the plane of the paper, those skilled in the art will recognize that the angled connector 480 can be angled out of the plane of the paper as well.

Still referring to FIG. 19, an alternate embodiment adjustable angled connector 484 includes a flexible central portion 486 such that an angle formed by a plane of the first connector end 484a and the second connector end 484b is adjustable. The flexible central portion 486 can be generally accordion-shaped or of other suitable design to allow the central portion 486 to flex. Although FIG. 19 shows the adjustable angled connector 484 to be angled parallel to the plane of the paper, those skilled in the art will recognize that the adjustable angled connector 484 can be angled out of the plane of the paper as well.

Still referring to FIG. 19, a light fixture 486 can be connected to the raceway 212. A light bulb 488 is replaceably connectable to the fixture 486 in a known manner. Preferably, but not necessarily, a sensor 490 can be electrically connected to the fixture 486 to automatically turn on/off the lightbulb 488 under predetermined specifications, such as time or ambient brightness. Additionally or alternatively, a mechanical timer or an ON/OFF switch can be used.

Referring now to FIGS. 23–25, the modular carrier system 400 further includes an outlet adapter 500 which is adapted to connect the at least one carrier member 412 to an electrical source at a junction box 564. Typically, the junction box 564 includes a double outlet electrical outlet 566, although those skilled in the art will recognize that any typical junction box 564 can be used. The outlet adapter 500 includes a cover plate 568. For the junction box 564 containing an outlet 566, the cover plate 568 includes a pair of spaced cutouts 570, which are sized to allow each outlet 566 to extend through the cover plate 568. Additionally, the cover plate 568 includes a notched opening 572 which is sized to allow a three conductor wire 418 to pass therethrough. The adapter 500 further includes a cover 574 which is adapted to be inserted over the cover plate 568 and the junction box 564. The cover 574 includes at least one opening 576 sized to allow the three conductor cable 418 to be passed therethrough and shaped to sealingly engage a connector key 420. Preferably, the opening 576 is located along one of the sides of the cover 574, although those skilled in the art will recognize that the opening 576 can be located in either the top or the bottom of the cover as well. The cover 574 further includes a hinged cover face 578 which is operable between an open position wherein the cover plate 568 is exposed and a closed position wherein the cover plate 568 is covered. The cover face 578 includes a plurality of recesses 578a which are sized to allow an electrical cord (not shown) of a device plugged into either of the three-pronged outlets 566 to pass through one of the recesses 578a and still allow the cover face 578 to fully close.

If the junction box 564 is recessed within a wall W as shown in FIG. 24, the cover 574 covers only the cover plate 568. If the junction box 564 is mounted to the wall W such that the junction box 564 extends outward from the wall W as shown in FIG. 25, the cover 574 covers the cover plate 568 and the exposed part of the junction box 564, as well.

Preferably, the components of the electrical system 400 described above are constructed of a rubberized or flexible plastic or other suitable polymeric material to allow at least nominal bending of the carrier member 412 and/or the angled connectors 480, 482, although those skilled in the art will recognize that the components of the electrical system 400 can be constructed of any other suitable dielectric material.

To form the raceway system 400, the user first secures the electrical power to the junction box 564 and removes any existing outlet covers from the outlet 566 at which the system 400 is to be installed. The user then runs the power cable 418 through the opening 576 in the cover 574. The user then connects the power cable 418 to a power cable in the junction box 564 at the power source. The user then connects the outlet adapter 500 to the junction box 564 and connects a first carrier member 412 to the cover 574 using a connector key 420.

To extend the system, the user connects a second carrier member 412' to the first carrier member 412 by inserting a free end of the connector key 420 on the second carrier member 412' into the enclosed channel 416 of the first carrier member 412 such that the connector key 420 is in the enclosed channel 416 both carrier members 412, 412'. Preferably, the carrier members 412, 412' are manufactured in predetermined lengths, such as in four foot or eight foot sections. However, each carrier member 412, 412' is severable between the first and second ends 412a, 412b at any desired lengths to allow for installation of the modular carrier system 400 in a particular application. Preferably, the user measures a desired length from the end 412a with the connector key 420 if the connector key 420 is required to form a connection with an adjacent piece, or from the end 412b without the connector key 420 if the connector key 420 is not required to form a connection with an adjacent piece. In FIG. 17, the carrier member 412' has been cut so that the connector key 420 for carrier member 412' is not required. The dielectric shell 414 is preferably constructed of a rubberized plastic or other relatively soft, bendable material and can be easily cut with a hand saw or other cutting device.

When the user desires to turn the direction of the system 400 or add a tee connection, the user connects the T-connector 470, the angled connector 482 or the adjustable angled connector 484 to one of the first and second ends 412a, 412b of a carrier member 412. When the user desires to provide an electrical connection, the user connects one of the connectors 450 to one of the first and second ends 412a, 412b of a carrier member 412. When the user desires to provide a light, the user connects the light fixture 486 to one of the first and second ends 412a, 412b of a carrier member 412. Preferably, the user terminates the system 400 with a terminating connector 464 or a light fixture 486.

After the system 400 is connected, the user can run the power cable 418 through the enclosed channel 422 by separating the first longitudinal portion 434 from the second longitudinal portion 436 and the second sides 434b, 436b of each of the first and second longitudinal portions 434, 436 and inserting the power cable 418 therein, and connecting the power cable 418 to the outlets 20 and/or the light fixture 486. The user can then run a plurality of low voltage cables 124a, 124b along the open channels 122, 148 of the carrier member 110 and connector 136, respectively, connecting the low voltage cables 124a, 124b to connectors 22 and jacks 24 in T-connectors 202, power connectors 154 and terminating connectors 162.

Preferably, each element described above which includes power cables includes a "hot" conductor, a "neutral" conductor, and a "ground" conductor. However, those skilled in the art will recognize that each element can include additional conductors as well. Preferably, the electrical outlets described above are 125 volt, 15 amp, Ground Fault Circuit Interrupter (GFCI), although those skilled in the art will recognize that the outlets can be other voltages and current ratings, and need not necessarily be GFCI.

Although the low voltage is discussed as being telephone or co-axial cable, those skilled in the art will recognize that other types of cables, including but not limited to, audio speaker cable and fiber optic cable, can also be run through the open or low voltage channels 22, 157a, 157b, and 428. In addition to or alternatively to the co-axial connectors 22 and the telephone cable connectors 24, speaker jacks, fiber optic connectors and other connectors (not shown) can be used.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined.

We claim:
1. An electrical carrier member comprising:
a dielectric shell having a longitudinal axis and a plurality of enclosed channels extending longitudinally therethrough, the shell having a first end and a second end;
an electrical conductor extending through each enclosed channel, each electrical conductor terminating proximate to the first end and the second end; and
at least one open channel extending longitudinally therethrough, the at least one open channel having a longitudinally extending opening to receive at least one conductor cable insertable laterally into the at least one open channel.

2. The electrical carrier member according to claim 1, wherein a plane of the first end and a plane of the second end are each generally perpendicular to the longitudinal axis of the shell.

3. The electrical carrier member according to claim 1, wherein the at least one conductor cable includes at least one of a co-axial cable, a telephone cable, a computer cable, and a speaker cable.

4. The electrical carrier member according to claim 1, wherein at least three enclosed channels extend through the shell.

5. The electrical carrier member according to claim 1, wherein the shell is adapted to mount to a surface.

* * * * *